(12) United States Patent
Ito et al.

(10) Patent No.: US 8,026,026 B2
(45) Date of Patent: Sep. 27, 2011

(54) COLORED PHOTOSENSITIVE RESIN COMPOSITION, COATING FILM OF COLORED PHOTOSENSITIVE RESIN COMPOSITION, PHOTOSENSITIVE RESIN TRANSFER MATERIAL, METHOD OF FOAMING PHOTOSENSITIVE RESIN LAYER, COLOR FILTER, METHOD FOR PRODUCING COLOR FILTER, AND LIQUID CRYSTAL DISPLAY DEVICE

(75) Inventors: Hideaki Ito, Shizuoka-ken (JP); Hideyuki Nakamura, Shizuoka-ken (JP); Mitsutoshi Tanaka, Shizuoka-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 12/761,153

(22) Filed: Apr. 15, 2010

(65) Prior Publication Data

US 2010/0195030 A1    Aug. 5, 2010

Related U.S. Application Data

(62) Division of application No. 11/155,601, filed on Jun. 20, 2005, now Pat. No. 7,727,685.

(30) Foreign Application Priority Data

Jun. 18, 2004 (JP) .................................. 2004-181587
Mar. 4, 2005 (JP) .................................. 2005-060629

(51) Int. Cl.
*G02B 5/20* (2006.01)
*G03F 1/1335* (2006.01)

(52) U.S. Cl. .......................... 430/7; 430/270.1; 349/106
(58) Field of Classification Search .................... None
See application file for complete search history.

(56) References Cited

U.S. PATENT DOCUMENTS

| 6,013,415 | A  | * | 1/2000 | Sakurai et al. | ............. | 430/281.1 |
| 6,060,199 | A  |   | 5/2000 | Nagata et al. | | |
| 6,280,890 | B1 | * | 8/2001 | Sawamura et al. | ............... | 430/7 |
| 2002/0094485 | A1 | | 7/2002 | Takebe | | |
| 2002/0119263 | A1 | | 8/2002 | Abe | | |
| 2005/0131114 | A1 | * | 6/2005 | Sunahara et al. | ............... | 524/88 |

FOREIGN PATENT DOCUMENTS

| JP | 2003 149801 A | 5/2003 |
| JP | 2004-126549 A | 4/2004 |
| JP | 2004 163902 A | 6/2004 |

* cited by examiner

*Primary Examiner* — John A. McPherson
(74) *Attorney, Agent, or Firm* — Sughrue Mion, PLLC

(57) ABSTRACT

A colored photosensitive resin composition comprising (1) an alkali-soluble binder, (2) a monomer or an oligomer, (3) a photopolymerizaton initiator or a photopolymerization initiator system, and (4) a coloring agent, wherein the coloring agent is a specific pigment in a specific quantity. Also provided is a color filter obtained by using the colored photosensitive resin compositions for formation of the respective photosensitive resin layers of R, G and B.

9 Claims, No Drawings

COLORED PHOTOSENSITIVE RESIN COMPOSITION, COATING FILM OF COLORED PHOTOSENSITIVE RESIN COMPOSITION, PHOTOSENSITIVE RESIN TRANSFER MATERIAL, METHOD OF FOAMING PHOTOSENSITIVE RESIN LAYER, COLOR FILTER, METHOD FOR PRODUCING COLOR FILTER, AND LIQUID CRYSTAL DISPLAY DEVICE

CROSS-REFERENCE TO RELATED APPLICATION

This is a divisional of application Ser. No. 11/155,601 filed Jun. 20, 2005. The entire disclosure of the prior application, application Ser. No. 11/155,601, is hereby incorporated by reference.

BACKGROUND OF THE INVENTION

1. Field of the Invention

The present invention relates to a color filter which is suitably used also in a large-screen liquid crystal display device such as a notebook computer and a television monitor, to a method for producing the color filter, to a photosensitive resin transfer material which is used in the color filter and in the method for producing the color filter, to a method of forming a photosensitive resin layer using the photosensitive resin transfer material, to a colored photosensitive resin composition used in the color filter and in the method for producing the color filter and the photosensitive resin transfer material, to a coating film of the colored photosensitive resin composition, and to a liquid display device using the color filter.

2. Description of the Related Art

A color filter is an essential constitutional member in a liquid crystal display (hereinafter, also referred to as "liquid crystal display device"). This liquid crystal display is very compact, and equivalent to or superior over a CRT display also in performance, and a CRT display is increasingly replaced by a liquid crystal display.

In formation of a color image on a liquid crystal display, light which has passed through a color filter is, as it is, colored into a color of each pixel constituting the color filter, and lights of those colors are combined to form a color image. Currently, a color image is formed of pixels of three colors of RGB.

In recent years, technical development of a liquid crystal display with a larger area and higher-definition has progressed, and its utility has been extended to a notebook computer display, a desktop personal computer monitor, and a television monitor. Under such circumstances, higher color purity is required also in a color filter used in a liquid crystal display.

However, in conventional large screen color filters (such as color filters disclosed in Japanese Patent Application Laid-Open (JP-A) No. 2004-126549), sufficient color purity has not been obtained, and there have been needs for further improvement.

SUMMARY OF THE INVENTION

The present invention provides a color filter with superior chromaticity which can realize a high color purity even when used in a large screen liquid crystal display device such as a notebook computer display and a television monitor. The invention also provides a method for producing the color filter. The invention further provides a photosensitive resin transfer material which is suitably used in the color filter and in the method for producing the color filter, and a method of forming a photosensitive resin layer using the photosensitive resin transfer material. The invention further provides a colored photosensitive resin composition which is suitably used in the color filter, in the method for producing the color filter, and in the photosensitive resin transfer material. The invention still further provides a coating film of the colored photosensitive resin composition, and a liquid crystal display device using the color filter.

A first aspect of the invention is to provide a colored photosensitive resin composition comprising an alkali-soluble binder, a monomer or an oligomer, a photopolymerization initiator or a photopolymerization initiator system, and a coloring agent. The coloring agent comprises a pigment C.I.P.R.254 and a pigment C.I.P.R.177. The content of the pigment C.I.P.R.254 is 0.80 to 0.96 g/m$^2$ in a dried film with a film thickness of 1 to 3 μm obtained by coating and drying the colored photosensitive resin composition. The content of the pigment C.I.P.R.177 is 0.20 to 0.24 g/m$^2$ in the dried film.

A second aspect of the invention is to provide a colored photosensitive resin composition comprising an alkali soluble binder, a monomer or an oligomer, a photopolymerization initiator or a photopolymerization initiator system, and a coloring agent. The coloring agent comprises a pigment C.I.P.G.36 and a pigment C.I.P.Y.150. The content of the pigment C.I.P.G. 36 is 0.90 to 1.34 g/m$^2$ in a dried film with a film thickness of 1 to 3 μm obtained by coating and drying the colored photosensitive resin composition. The content of the pigment C.I.P.Y.150 is 0.38 to 0.58 g/m$^2$ in the dried film.

A third aspect of the invention is to provide a colored photosensitive resin composition comprising an alkali-soluble binder, a monomer or an oligomer, a photopolymerization initiator or a photopolymerization initiator system, and a coloring agent. The coloring agent comprises a pigment C.I.P.B.15:6 and a pigment C.I.P.V.23. The content of the pigment C.I.P.B.15:6 is 0.59 to 0.67 g/m$^2$ in a dried film with a film thickness of 1 to 3 μm obtained by coating and drying the colored photosensitive resin composition, and the content of the pigment C.I.P.V.23 is 0.065 to 0.075 g/m$^2$ in the dried film.

The above colored photosensitive resin compositions each may contain a surfactant.

The above colored photosensitive resin composition each may further comprise at least two types of photopolymerization initiators as the photopolymerization initiator or as the photopolymerization initiator system.

A fourth aspect of the invention is to provide a photosensitive resin transfer material comprising a photosensitive resin layer formed on a temporary support by using any of the above colored photosensitive resin compositions.

A fifth aspect of the invention is to provide a coating film. The coating film comprises a colored photosensitive resin composition comprising an alkali-soluble binder, a monomer or an oligomer, a photopolymerization initiator or a photopolymerization initiator system, and a coloring agent. The coloring agent comprises a pigment C.I.P.R.254 and a pigment C.I.P.R.177. The content of the pigment C.I.P.R.254 in the coating film is 0.80 to 0.96 g/m$^2$. The content of the pigment C.I.P.R.177 in the coating film is 0.20 to 0.24 g/m$^2$.

A sixth aspect of the invention is to provide a coating film. The coating film comprises a colored photosensitive resin composition comprising an alkali soluble binder, a monomer or an oligomer, a photopolymerization initiator or a photopolymerization initiator system, and a coloring agent. The coloring agent comprises a pigment C.I.P.G.36 and a pigment C.I.P.Y.150. The content of the pigment C.I.P.G. 36 in the coating film is 0.90 to 1.34 g/m². The content of the pigment C.I.P.Y.150 in the coating film is 0.38 to 0.58 g/m².

A seventh aspect of the invention is to provide a coating film. The coating film comprises a colored photosensitive resin composition comprising an alkali-soluble binder, a monomer or an oligomer, a photopolymerization initiator or a photopolymerization initiator system, and a coloring agent. The coloring agent comprises a pigment C.I.P.B.15:6 and a pigment C.I.P.V.23. The content of the pigment C.I.P.B.15:6 in the coating film is 0.59 to 0.67 g/m², and the content of the pigment C.I.P.V.23 in the coating film is 0.065 to 0.075 g/m².

The above coating films each may further comprise at least two types of photopolymerization initiators as the photopolymerization initiator or as the photopolymerization initiator system.

The above coating films each may be formed by: coating the colored photosensitive resin composition by using a slit nozzle, and drying the colored photosensitive resin composition.

An eighth aspect of the invention is to provide a color filter. The color filter comprises a red (R) photosensitive resin layer, a green (G) photosensitive resin layer, and a blue (B) photosensitive resin layer. The red (R) photosensitive resin layer may comprise the colored photosensitive resin composition of the first aspect. The green (G) photosensitive resin layer may comprise the colored photosensitive resin composition of the second aspect. The blue (B) photosensitive resin layer may comprise the colored photosensitive resin composition of the third aspect.

A ninth aspect of the invention is to provide a color filter. The color filter comprises a red (R) photosensitive resin layer, a green (G) photosensitive resin layer, and a blue (B) photosensitive resin layer. The red (R) photosensitive resin layer may comprise the coating film of the fifth aspect. The green (G) photosensitive resin layer may comprise the coating film of the sixth aspect. The blue (B) photosensitive resin layer may comprise the coating film of the seventh aspect.

A tenth aspect of the invention is to provide a method of forming a photosensitive resin layer, the method comprising adhering the photosensitive resin transfer material of the fourth aspect to a substrate by a laminator.

An eleventh aspect of the invention is to provide a method for producing a color filter. The method comprises forming a photosensitive resin layer, exposing the photosensitive resin layer, developing the photosensitive resin layer, and baking the photosensitive resin layer. The photosensitive resin layer may comprise any of the above colored photosensitive resin compositions or any of the above coating films, or the photosensitive resin layer may be formed by the method of the tenth aspect. The invention also provides a color filter produced by the method.

A twelfth aspect of the invention is to provide a liquid crystal display device using the above color filter.

DETAILED DESCRIPTION OF THE INVENTION

First, a colored photosensitive resin composition of the present invention will be explained. Thereafter, a coating film of the colored photosensitive resin composition, a photosensitive resin transfer material, a color filter, production methods thereof, and a liquid crystal display device of the invention will be described sequentially.

<Colored Photosensitive Resin Composition>

The colored photosensitive resin composition of the invention is a colored photosensitive composition comprising at least (1) an alkali-soluble binder (2) a monomer or a oligomer, (3) a photopolymerization initiator or a photopolymerization initiator system, and (4) a coloring agent, wherein a specified pigment is used as the coloring agent at a specific content. In the specification, sometimes, the content of the pigment in the colored photosensitive composition is expressed in terms of the quantity in a dry film having a thickness of 1 to 3 μm. Such an expression is intended to mean that there exists a dry film thickness within the range of 1 to 3 μm at which the quantity of the pigment is within the specified range. Accordingly, the quantity of the pigment may not be always within the specified range throughout the entire dry film thickness range of 1 to 3 μm.

First, essential components (1) to (4) will be explained.

(1) Alkali-Soluble Binder

The alkali-soluble binder (hereinafter, simply referred to as "binder" in some cases) used in the invention is preferably a polymer having a polar group such as a carboxylic acid group or a carboxylate group on a side chain thereof. Examples thereof include a metahcrylic acid copolymer, an acrylic acid copolymer, an itaconic acid copolymer, a crotonic acid copolymer, a maleic acid copolymer, and a partially-esterified maleic acid copolymer. Such copolymers are disclosed, for example, in JP-A No. 59-44615, Japanese Patent Publication (JP-B) No. 54-34327, JP-B No. 58-12577, JP-B No. 54-25957, JP-A No. 59-53836 and JP-A No. 59-71048, the disclosures of which are incorporated herein by reference. Examples of the alkali-soluble binder further include a cellulose derivative having a carboxylic acid group on a side chain thereof and a polymer obtained by adding a cyclic acid anhydride to a polymer having a hydroxyl group. Particularly preferable examples include a copolymer of benzyl(meth) acrylate and (meth)acrylic acid, and a multi-component copolymer of benzyl(meth)acrylate, (meth)acrylic acid and other monomers, such as the copolymers described in U.S. Pat. No. 4,139,391, the disclosure of which is incorporated herein by reference. These binder polymers having polar groups each may be used alone or may be contained in a composition which also contains a usual film-forming polymer. The proportion of the colored photosensitive resin composition to the total solid content is generally 20 to 50% by mass, preferably 25 to 45% by mass.

(2) Monomer or Oligomer

The monomer or oligomer used in the invention is preferably a monomer or oligomer which has two or more ethylenic unsaturated double bonds and which is addition-polymerized by irradiation with light. The monomer or oligomer may be a compound having at least one addition-polymerizable ethylenic unsaturated group therein and having a boiling point of 100° C. or higher at a normal pressure. Examples thereof include: a monofunctional acrylate and a monofunctional methacrylate such as polyethylene glycol mono(meth)acrylate, polypropylene glycol mono(meth)acrylate and phenoxyethyl(meth)acrylate; polyethylene glycol di(meth)acrylate, polypropylene glycol di(meth)acrylate, trimethylolethane triacrylate, trimethylolpropane tri(meth) acrylate, trimethylolpropane diacrylate, neopentyl glycol di(meth)acrylate, pentaerythritol tetra(meth)acrylate, pentaerythritol tri(meth)acrylate, dipentaerythritol hexa(meth) acrylate, dipentaerythritol penta(meth)acrylate, hexanediol di(meth)acrylate, trimethylolpropane tri(acryloyloxypropyl) ether, tri(acryloyloxyethyl)isocyanurate, tri(acryloyloxyethyl)cyanurate, glycerin tri(meth)acrylate; a polyfunctional acrylate or polyfunctional methacrylate which may be obtained by adding ethylene oxide or propylene oxide to a polyfunctional alcohol such as polymethylolpropane or glycerin and converting the adduct into a (meth)acrylate.

Examples of the monomer and oligomer further include an urethane acrylate such as urethane acrylates described in JP-B No. 48-41708, JP-B No. 50-6034 and JP-A No. 51-37193 (the disclosures of which are incorporated herein by reference), and a polyester acrylate such as polyester acrylates described in JP-A 48-64183, JP-B 49-43191, and JP-B 52-30490 (the disclosures of which are incorporated herein by reference); a polyfunctional acrylate or polyfunctional methacrylate such as an epoxy acrylate which is a product of reaction of an epoxy resin and (meth)acrylic acid.

Among them, trimethylolpropane tri(meth)acrylate, pentaerythritol tetra(meth)acrylate, dipentaerythritol hexa(meth)acrylate, and dipentaerythritol penta(meth)acrylate are preferable.

Additionally, "polymerizable compound B" described in JP-A No. 11-133600 (the disclosure of which is incorporated herein by reference) is also preferable.

These monomers and oligomers each may be used alone. Alternatively, a mixture of two or more selected from these monomers and oligomers may be used. The proportion of the colored photosensitive resin composition to the total solid content is generally 5 to 50% by mass, preferably 10 to 40% by mass.

(3) Photopolymerization Initiator or Photopolymerization Initiator System

Examples of a photopolymerization initiator or a photopolymerization initiator system in the invention include a vicinal polyketaldonyl compound such as vicinal polyketaldonyl compounds disclosed in U.S. Pat. No. 2,367,660 (the disclosure of which is incorporated herein by reference), an acyloin ether compound such as acyloin ether compounds described in U.S. Pat. No. 2,448,828 (the disclosure of which is incorporated herein by reference), an aromatic acyloin compound substituted by an α-hydrocarbon such as described in U.S. Pat. No. 2,722,512 (the disclosure of which is incorporated herein by reference), a polynuclear quinine compound such as described in U.S. Pat. Nos. 3,046,127 and 2,951,758 (the disclosures of which are incorporated herein by reference), a combination of triarylimidazole dimer and p-ketone such as described in U.S. Pat. No. 3,549,367 (the disclosure of which is incorporated herein by reference), a benzothiazole compound and a trihalomethyl-s-triazine compound such as described in JP-B No. 51-48516 (the disclosure of which is incorporated herein by reference), a trihalomethyl-triazine compound such as described in U.S. Pat. No. 4,239,850 (the disclosure of which is incorporated herein by reference), and a trihalomethyloxadiazole compound such as described in U.S. Pat. No. 4,212,976 (the disclosure of which is incorporated herein by reference). In particular, trihalomethyl-s-triazine, trihalomethyloxadiazole and triarylimidazole dimer are preferable.

Additionally, "polymerization initiator C" described in JP-A No. 11-133600 (the disclosure of which is incorporated herein by reference) is also preferable.

These photopolymerization initiators and photopolymerization initiator system each may be used alone. Alternatively, a mixture of two or more selected from these photopolymerizable initiators and photopolymerization initiator systems may be used. It is preferable to use two or more selected from photopolymerizable initiators and photopolymerization initiator systems. When two or more selected from photopolymerizable initiators and photopolymerization initiator systems are used, the display property, particularly evenness of display, can be improved.

The proportion of the photopolymerization initiator and photopolymerization initiator system to the total solid content of the colored photosensitive resin composition is generally 0.5 to 20% by mass, preferably 1 to 15% by mass.

(4) Coloring Agent

In the invention, (i) the red (R)-colored photosensitive resin composition comprises C.I.Pigment red (C.I.P.R.) 254 and C.I.Pigment red (C.I.P.R)177 as the coloring agents; (ii) the green (G)-colored photosensitive resin composition comprises C.I.Pigment green (C.I.P.G) 36 and C.I.Pigment yellow (C.I.P.Y)150 as the coloring agents; and (iii) the blue (B)-colored photosensitive resin composition comprises C.I.Pigment blue (C.I.P.B)15:6 and C,I,Pitment violet (C.I.P.V.)23 as the coloring agents.

When a dry film of the (i) red-colored photosensitive resin composition with a thickness of 1 to 3 µm is formed, the content of C.I.P.R.254 in the dry film is 0.80 to 0.96 g/m$^2$, preferably 0.82 to 0.94 g/m$^2$, more preferably 0.84 to 0.92 g/m$^2$.

When a dry film of the (i) red-colored photosensitive resin composition with a thickness of 1 to 3 µm is formed, the content of C.I.P.R.177 in the dry film is 0.20 to 0.24 g/m$^2$, preferably 0.21 to 0.23 g/m$^2$, more preferably 0.215 to 0.225 g/m$^2$.

When a dry film of the (ii) green-colored photosensitive resin composition with a thickness of 1 to 3 µm is formed, the content of C.I.P.G36 in the dry film is 0.90 to 1.34 g/m$^2$, preferably 0.95 to 1.29 g/m$^2$, more preferably 1.01 to 1.23 g/m$^2$.

When a dry film of the (ii) green-colored photosensitive resin composition with a thickness of 1 to 3 µm is formed, the content of C.I.P.Y.150 in the dry film is 0.38 to 0.58 g/m$^2$, preferably 0.40 to 0.56 g/m$^2$, more preferably 0.43 to 0.53 g/m$^2$.

When a dry film of the (iii) blue-colored photosensitive resin composition with a thickness of 1 to 3 µm is formed, the content of C.I.P.B.15:6 in the dry film is 0.59 to 0.67 g/m$^2$, preferably 0.60 to 0.66 g/m$^2$, more preferably 0.61 to 0.65 g/m$^2$.

When a dry film of the (iii) blue-colored photosensitive resin composition with a thickness of 1 to 3 µm is formed, the content of C.I.P.V.23 in the dry film is 0.065 to 0.075 g/m$^2$, preferably 0.066 to 0.074 g/m$^2$, more preferably 0.067 to 0.073 g/m$^2$.

These pigments are each preferably used preferably in the form of a dispersion liquid. This dispersion liquid can be prepared by: adding a composition obtained by mixing the pigment and a pigment dispersant to an organic solvent (or a vehicle) described later, and dispersing the composition in the organic solvent (or the vehicle). The vehicle refers to the medium dispersing the pigment when a paint is in the liquid state, and includes a liquid component (binder) which binds to the pigment to solidify the coating film, and a component (organic solvent) which dissolves and dilutes the binder. The dispersing machine used for dispersing the pigment is not particularly limited, and examples thereof include known dispersing machines such as a kneader, a roll mill, an attritor, a supermill, a dissolver, a homomixer and a sand mill.

The coloring agent (pigment) used in the invention has a particle diameter of preferably 0.1 µm or smaller, more preferably 0.08 µm or smaller.

(Other Additives)

—Solvent—

The colored photosensitive resin composition of the invention may comprise an organic solvent, in addition to the aforementioned components. Examples of the organic solvent include methyl ethyl ketone, propylene glycol monomethyl ether, propylene glycol monomethyl ether acetate, cyclohexanone, cyclohexanol, methyl isobutyl ketone, ethyl lactate, methyl lactate, and caprolactam.

—Surfactant—

In conventional color filters, there was a problem that the color of each pixel is deep in order to realize a high color purity, whereby unevenness of the film thickness of pixels is directly recognized as color unevenness. For this reason, suppression of the film thickness variation upon formation (coating) of a photosensitive resin layer has been desired which directly influences the film thickness of pixels.

In the color filter of the invention or the photosensitive resin transfer material of the invention, the colored photosensitive resin composition preferably comprises a suitable surfactant in order to achieve a uniform film thickness and in order to prevent the coating unevenness (color unevenness caused by variation in the film thickness) effectively.

Preferable examples of the surfactant include surfactants disclosed in JP-A No. 2003-337424 and JP-A No. 11-133600, the disclosures of which are incorporated herein by reference.

—Thermal Polymerization Inhibitor—

In a preferable embodiment, the colored photosensitive resin composition of the invention includes a thermal polymerization inhibitor. Examples of the thermal polymerization inhibitor include hydroquinone, hydroquinone monomethyl ether, p-methoxyphenol, di-t-butyl-p-cresol, pyrogallol, t-butylcatechol, benzoquinone, 4,4'-thiobis(3-methyl-6-t-butylphenol), 2,2'-methylenebis(4-methyl-6-t-butylphenol), 2-mercaptobenzimidazole, and phenothiazine.

—Dye and Pigment to be Used Supplementarily—

If necessary, in addition to the aforementioned coloring agent (pigment), the colored photosensitive resin composition of the invention may further include a known coloring agent (a dye or a pigment) as long as the effect of the invention is not deteriorated. When the known coloring agent is a pigment, the pigment is preferably dispersed in the colored photosensitive resin composition uniformly; therefore, the particle diameter of such a pigment is preferably 0.1 µm or smaller, more preferably 0.08 µm or smaller.

Examples of the known dye and pigment include the colorants disclosed in paragraphs [0038] to [0040] of JP-A No. 2005-17716 (the disclosure of which is incorporated herein by reference), in paragraphs [0068] to [0072] of JP-A No. 2005-361447 (the disclosure of which is incorporated herein by reference), and in paragraphs [0080] to [0088] of JP-A No. 2005-17521 (the disclosure of which is incorporated herein by reference).

—Ultraviolet-Ray Absorber—

If necessary, the colored photosensitive resin composition of the invention may include an ultraviolet-ray absorber. Examples of the ultraviolet-ray absorber include compounds disclosed in JP-A No. 5-72724 (the disclosure of which is incorporated herein by reference), a salicylate-based ultraviolet-ray absorber, a benzophenone-based ultraviolet-ray absorber, a benzotriazole-based ultraviolet-ray absorber, a cyanoacrylate-based ultraviolet-ray absorber, a nickel-chelate-based ultraviolet-ray absorber, and a hindered-amine-based ultraviolet-ray absorber.

Specific examples thereof include phenyl salicylate, 4-t-butyl phenylsalicylate, 2,4-di-t-butyl phenyl-3',5'-di-t-4'-hydroxybenzoate, 4-t-butyl phenylsalicylate, 2,4-dihydroxybenzophenone, 2-hydroxy-4-methoxybenzophenone, 2-hydroxy-4-n-octoxybenzophenone, 2-(2'-hydroxy-5'-methylphenyl)benzotriazole, 2-(2'-hydroxy-3'-t-butyl-5'-methylphenyl)-5-chlorobenzotriazole, ethyl-2-cyano-3,3-diphenyl acrylate, 2,2'-hydroxy-4-methoxybenzophenone, nickel dibutyl dithiocarbamate, bis(2,2,6,6-tetramethyl-4-pyridine)-sebacate, 4-t-butyl phenylsalicylate, phenyl salicylate, 4-hydroxy-2,2,6,6-tetramethylpiperidine condensate, succinic acid-bis(2,2,6,6-tetramethyl-4-piperidenyl)-ester, 2-[2-hydroxy-3,5-bis(α, α-dimethylbenzyl)phenyl]-2H-benzotriazole, and 7-{[4-chloro-6-(diethylamino)-5-triazine-2-yl]amino}-3-phenylcoumarin.

In addition to the aforementioned additives, the colored photosensitive resin composition of the invention may further include an "adhesion auxiliary" described in JP-A No. 11-133600 (the disclosure of which is incorporated herein by reference) and other additives.

<Coating Film of Colored Photosensitive Resin Composition>

The coating film of the invention made of a colored photosensitive resin composition is a coating film of a colored photosensitive resin composition comprising at least (1) an alkali-soluble binder, (2) a monomer or an oligomer, (3) a photopolymerization initiator or a photopolymerization initiator system, and (4) a coloring agent, wherein a specific pigment in a specific amount is used as the coloring agent.

The essential components (1) to (4) and other components are the same as in the above description of the colored photosensitive resin composition.

(Slit Nozzle)

The coating film can be formed by coating the colored photosensitive resin composition of the invention by a known coating method and drying the colored photosensitive resin composition. In a preferable embodiment, the colored photosensitive resin composition is coated by using a slit nozzle having a slit at a portion through which the coating liquid is discharged. Specifically, preferable are slit nozzles and slit coaters described in JP-A No. 2004-89851, JP-A No. 2004-17043, JP-A No. 2003-170098, JP-A No. 2003-164787, JP-A No. 2003-10767, JP-A No. 2002-79163, and JP-A No. 2001-310147, the disclosures of which are incorporated herein by reference.

<Photosensitive Resin Transfer Material>

Next, the photosensitive resin transfer material of the invention will be described.

The photosensitive resin transfer material of the invention is preferably formed by using a composite film, similarly to the photosensitive resin transfer material described in JP-A No. 5-72724, the disclosure of which is incorporated herein by reference. The structure of the composite film may be, for example, a lamination in which a temporary support, a thermoplastic resin layer, an intermediate layer, a photosensitive resin layer, and a protective film are disposed in this order.

The photosensitive resin layer of the photosensitive resin transfer material of the invention is formed by using the aforementioned colored photosensitive resin composition of the invention.

(Temporary Support)

The temporary support is a flexible support which does not deform, shrink, or elongate remarkably even under pressure, or under pressure and heat. Examples of such a temporary support include a polyethylene terephthalate film, a cellulose triacetate film, a polystyrene film, and a polycarbonate film. Among them, a biaxially-stretched polystyrene terephthalate film is particularly preferable.

(Thermoplastic Resin Layer)

The substance used in the thermoplastic resin layer is preferably an organic polymer substance described in JP-A No. 5-72724 (the disclosure of which is incorporated herein by reference). The substance is more preferably an organic polymer substance having a softening point of about 80° C. or lower according to the Vicat method (specifically, the method of measuring a polymer softening point according to American Material Test Method ASTMD1235, which is incorporated herein by reference). Specifically, the substance may be an organic polymer, and examples thereof include: a polyolefin such as polyethylene or polypropylene; an ethylene copolymer such as a copolymer of ethylene and vinyl acetate or a saponified product thereof; a copolymer of ethylene and acrylic acid ester or a saponified product thereof; polyvinyl chloride; a vinyl chloride copolymer such as a copolymer of vinyl chloride and vinyl acetate or a saponified product thereof; polyvinylidene chloride; a vinylidene chloride copolymer; polystyrene; a styrene copolymer such as a copolymer of styrene and (meth)acrylic acid ester or a saponified product thereof; polyvinyl toluene; a vinyltoluene copolymer such as a copolymer of vinyltoluene and (meth) acrylic acid ester or a saponified product thereof; poly(meth) acrylic acid ester; a (meth)acrylic acid ester copolymer such as a copolymer of butyl(meth)acrylate and vinyl acetate; and a polyamide resin such as a vinyl acetate copolymer nylon, a copolymerized nylon, N-alkoxymethylated nylon, and N-dimethylaminated nylon.

(Intermediate Layer)

In the photosensitive resin transfer material of the invention, it is preferable to provide an intermediate layer so as to prevent mixing of components during application of a plurality of coating layers and during storage after the application. The intermediate layer is preferably an oxygen blocking film having oxygen blocking function described as "a separating layer" in JP-A No. 5-72724, the disclosure of which is incorporated herein by reference. By using such an oxygen blocking film, the exposure sensitivity is heightened, the time load of the exposing machine is decreased, and the productivity is improved.

The oxygen blocking film is preferably a film with a low oxygen permeability which is dispersible or dissolvable in water or an aqueous alkaline solution. Such a film may be properly selected from known oxygen blocking films. Among them, a combination of polyvinyl alcohol and polyvinylpyrrolidone is particularly preferable.

(Protective Film)

It is preferable to provide a protective film on a photosensitive resin layer in order to protect the photosensitive resin layer from pollution or damage at storage. The protective layer may be thin. The protective film may comprise a material which is the same as or similar to that of the temporary support. The protective film should be able to be easily separated from the photosensitive resin layer. The protective film material may be, for example, silicone paper, polyolefin sheet or polytetrafluoroethylene sheet.

(Method for Preparing Photosensitive Resin Transfer Material)

The photosensitive resin transfer material of the invention can be prepared by: coating a temporary support with a coating liquid (coating liquid for thermoplastic resin layer) in which additives for a thermoplastic resin layer are dissolved and drying the coating liquid to form a thermoplastic resin layer; and then coating the thermoplastic resin layer with a coating liquid for an intermediate layer containing a solvent which does not dissolve the thermoplastic resin layer, and drying the coating liquid for an intermediate layer; and then, coating the intermediate layer with a coating liquid for a photosensitive resin layer containing a solvent which does not dissolve the intermediate layer, and drying the coating liquid for a photosensitive resin layer.

In another embodiment, the photosensitive resin transfer material is prepared by: preparing a sheet in which a thermoplastic resin layer and an intermediate layer are disposed on a temporary support, and a sheet in which a photosensitive resin layer is disposed on a protective film; and adhering the sheets to each other such that the intermediate layer and the photosensitive resin layer contact each other. In another embodiment, the photosensitive resin transfer material is prepared by: preparing a sheet in which a thermoplastic resin layer is disposed on a temporary support, and a sheet in which a photosensitive resin layer and an intermediate layer are disposed on a protective film; and adhering the sheets to each other such that the thermoplastic resin layer and the intermediate layer contact each other.

In the photosensitive resin transfer material of the invention, the thickness of the photosensitive resin layer is preferably 1.0 to 5.0 µm, more preferably 1.0 to 4.0 µm, particularly preferably 1.0 to 3.0 µm.

In general, the thickness of the temporary support is preferably 15 to 100 µm, the thickness of the thermoplastic resin layer is preferably 2 to 30 µm, the thickness of the intermediate layer is preferably 0.5 to 3.0 µm, and the thickness of the protective film is preferably 4 to 40 µm. However, the thicknesses of respective layers are not limited to the above range.

Coating operation in the above methods may be performed by a known coating apparatus. In the invention, it is preferable to conduct the coating operation with the coating apparatus (slit coater) using a slit nozzle described in the above description of the coating film of a colored photosensitive resin composition. Preferable examples of the slit coater are also as described above.

<Color Filter and Method for Producing Color Filter>

(Photosensitive Resin Layer)

In the color filter of the invention: the red (R) photosensitive resin layer comprises the colored photosensitive resin composition containing C.I.P.R.254 and C.I.P.R.177 as the coloring agents or the coating film of the colored photosensitive resin composition containing C.I.P.R.254 and C.I.P.R.177 as the coloring agents; the green (G) photosensitive resin layer comprises the colored photosensitive resin composition containing C.I.P.G36 and C.I.P.Y.150 as the coloring agents or the coating film of the colored photosensitive resin composition containing C.I.P.G36 and C.I.P.Y.150 as the coloring agents; and the blue (B) photosensitive resin layer comprises the colored photosensitive resin composition containing C.I.P.B.15:6 and C.I.P.V.23 as the coloring agents or the coating film of the colored photosensitive resin composition containing C.I.P.B.15:6 and C.I.P.V.23 as the coloring agents.

The color filter of the invention having the above features achieves a superior chromaticity under F10 light source at 2-degree viewing angle; particularly, even when used in a large screen liquid crystal display device, the color filter of the invention realizes high color purity.

In the color filter of the invention, the difference (ΔE) between the chromaticity of the red (R) photosensitive resin layer measured under a F10 light source and the target chromaticity for red shown in Table 1, the difference (ΔE) between the chromaticity of the green (G) photosensitive resin layer measured under a F10 light source and the target chromaticity for green shown in Table 1, the difference (ΔE) between the chromaticity of the blue (B) photosensitive resin layer measured under a F10 light source and the target chromaticity for blue shown in Table 1, are each preferably 5 or smaller, more preferably 3 or smaller, still more preferably 2 or smaller.

Herein, chromaticity in the invention is measured by a microscopic spectrophotometer (OSP100 or 200 manufactured by Olympus Optics) and expressed in terms of xyY values of the xyz color system obtained by calculation as a result under an F10 light source at 2-degree viewing angle. In addition, the difference from the target chromaticity is expressed in terms of a color difference of a La*b* color system.

TABLE 1

|   | x | y | Y |
|---|---|---|---|
| R | 0.656 | 0.336 | 21.4 |
| G | 0.293 | 0.634 | 52.1 |
| B | 0.146 | 0.088 | 6.90 |

The color filter of the invention can be produced by a known method such as a method of repeating, until the layers of the respective colors are provided, the process comprising: forming a photosensitive resin layer on a substrate; and exposing and developing the photosensitive resin layer. Black matrix may be introduced so as to partition the color filter into sections, in accordance with the necessity.

In the above production method, formation of the photosensitive resin layer on a substrate may be conducted, for example by (a) applying the respective colored photosensitive resin compositions by a known coating device or by (b) using the photosensitive resin transfer material so as to adhere the photosensitive resin layer by a laminator.

(a) Application by Coating Device

A known coating apparatus may be used for applying a colored photosensitive resin composition in the production method of the color filter of the invention. The slit-coater explained in the above description of the coating film of a colored photosensitive resin composition is particularly preferable. Preferable examples of the slit coater are also as described above. When the photosensitive resin layer is formed by coating, its film thickness is preferably 1.0 to 3.0 μm, more preferably 1.0 to 2.5 μm, still more preferably 1.0 to 2.0 μm.

(b) Adhering by Laminator

Using the photosensitive resin transfer material of the invention, the photosensitive resin layer formed in the film shape may be adhered to the substrate described later by a heated and/or pressurized roller or flat plate by pressure adhesion or heat pressure adhesion. Specifically, laminators and laminating methods described in the following documents may be used: JP-A No. 7-110575, JP-A No. 11-77942, JP-A No. 2000-334836, and JP-A No. 2002-148794, the disclosures of which are incorporated herein by reference. From the viewpoint of suppression of contamination, it is preferable to use the method described in JP-A No. 7-110575. When a photosensitive resin layer is provided by the photosensitive resin transfer material of the invention, the preferable range of the film thickness of the photosensitive resin layer is the same as the preferable range of the film thickness described in the above description of the photosensitive resin transfer material.

(Substrate)

In the invention, the substrate on which a color filter is to be formed may be, for example, a transparent substrate, and examples thereof include known glass plates such as a soda glass plate having a silicon oxide film on its surface, a low-expansion glass, a non-alkali glass, and a quartz glass plate, and a plastic film.

By subjecting the substrate to a coupling treatment in advance, adhesion of the substrate to the colored photosensitive resin composition or the photosensitive resin transfer material can be improved. The method described in JP-A No. 2000-39033 (the disclosure of which is incorporated herein by reference) is preferable as the coupling treatment. The thickness of the substrate is not particularly limited, and is preferably 700 to 1200 μm in general.

(Oxygen Blocking Film)

In the color filter of the invention, when the photosensitive resin layer is formed by application of the colored photosensitive resin composition, an oxygen blocking film may be further provided on the photosensitive resin layer, whereby the exposure sensitivity can be improved. The oxygen blocking film may be the same as described in the above explanation of the intermediate layer of the photosensitive resin transfer material. The thickness of the oxygen blocking film is not particularly limited, and is preferably 0.5 to 3.0 μm in general.

(Exposure and Development)

The color filter of the invention can be obtained by repeating, until the resin layers of the respective colors are provided, the process comprising: arranging a predetermined mask over the photosensitive resin layer formed on the substrate; exposing the photosensitive resin layer to light from above the mask which has passed through the mask, the thermoplastic resin layer and the intermediate layer, and then developing the photosensitive resin layer with a developer.

The light source for the exposure can be suitably selected from light sources capable of emitting lights within the wavelength region (e.g. 365 nm, 405 nm, etc.) capable of curing the photosensitive resin layer. Specific examples thereof include an ultrahigh pressure mercury lamp, a high pressure mercury lamp, and a metal halide lamp. The exposure amount is usually about 5 to 200 mJ/cm$^2$, preferably about 10 to 100 mJ/cm$^2$.

The developer is not particularly limited, and may be a known developer such as the developer described in JP-A No. 5-72724, the disclosure of which is incorporated herein by reference. The developer is preferably a developer capable of dissolving the photosensitive resin layer during development; for example, a developer containing a compound with a pKa of 7 to 13 at a concentration of 0.05 to 5 mol/L is preferable. The developer may include a small amount of an organic solvent miscible with water.

Examples of the organic solvent miscible with water include methanol, ethanol, 2-propanol, 1-propanol, butanol, diacetonealcohol, ethylene glycol monomethyl ether, ethylene glycol monoethyl ether, ethylene glycol mono-n-butyl ether, benzyl alcohol, acetone, methyl ethyl ketone, cyclohexanone, ε-caprolactone, γ-butyrolactone, dimethylformamide, dimethylacetamide, hexamethylphosphoramide, ethyl lactate, methyl lactate, ε-caprolactam, and n-methylpyrrolidone. The concentration of the organic solvent is preferably 0.1% by mass to 30% by mass.

A known surfactant may be further added to the developer. The concentration of the surfactant is preferably 0.01% by mass to 10% by mass.

The developing method may be a known method such as paddle development, shower development, shower & spin development, or dip development.

In the shower development, the developer is provided onto the photosensitive resin layer after exposure with a shower, so that the uncured portion is removed. It is preferable to provide an alkaline solution having poor ability to dissolve the photosensitive resin layer by using a shower before development, so as to remove the thermoplastic resin layer and the intermediate layer. Further, it is preferable to provide a cleaner by using a shower after development while rubbing the surface with a brush or the like to remove the residue.

The liquid temperature of the developer is preferably 20° C. to 40° C., and the pH of the developer is preferably 8 to 13.

In an embodiment of the production of the color filter of the invention, the colored photosensitive resin composition for forming a color filter are stacked to form a base, a transparent electrode is formed thereon, and protrusions for split-orientation is further provided thereon to form a spacer, as described in JP-A No. 11-248921 and Japanese Patent No. 3255107, the disclosures of which are incorporated herein by reference. This embodiment is preferable from the viewpoint of reduction of the cost. The split-orientation refers to a state in which there are, within the same pixel, two or more regions (domains) with different orientations of the liquid-crystal molecules.

When the colored photosensitive resin compositions are stacked by successive coating operations, the film thickness becomes smaller in every overlaying owing to the leveling of the coating liquid. For this reason, it is preferable to stack the four colors of K (black), R, G and B and to provide protrusions for split-orientation thereon. On the other hand, when the transfer material having a thermoplastic resin layer is used, it is preferable to stack two or three colors since the thicknesses are maintained constant.

In order to prevent deformation of the photosensitive resin layer upon lamination by overlaying the transfer material and to maintain a constant thickness, the size of the base is preferably 25 μm or larger, more preferably 30 μm or larger.

<Liquid Crystal Display Device>

The liquid crystal display device of the invention uses the color filter of the invention having better chromaticity under an F10 light source at 2-degree viewing angle, thereby realizing high color purity and effectively preventing the coating unevenness (color unevenness caused by variation in film thickness). The liquid crystal display device of the invention can be suitably used also as a large screen liquid crystal display device such as a display for a notebook computer and a television monitor.

EXAMPLES

The present invention will be explained in more detail using Examples. However, the invention is not limited to these Examples. Unless otherwise indicated, hereinafter, "part", "%" and "molecular weight" indicate "part by mass", "% by mass" and "weight average molecular weight", respectively.

Example 1

Production of Color Filter (Production by Application Using Slit Nozzle)

—Formation of Black (K) Image—

A non-alkali glass substrate was washed by a UV washing device, then brush-washed with a cleaner, and then subjected to ultrasonic washing with ultrapure water. The substrate was heat-treated at 120° C. for 3 minutes to stabilize the surface state.

The glass substrate was cooled and its temperature was adjusted to 23° C. Then, the substrate was coated with a colored photosensitive resin composition K1 having a composition shown in the following Table 2 by a coater for a glass substrate (trade name: MH-1600 manufactured by FAS Japan) having a slit nozzle. Subsequently, a part of the solvent was removed by drying with a VCD (vacuum drying apparatus; manufactured by Tokyo Ohka Kogyo Co., Ltd.) for 30 seconds to eliminate the fluidity of the coating layer, then unnecessary coating liquid around the substrate was removed by an EBR (Edge Bead Remover), and the glass substrate with the coating layer was pre-baked at 120° C. for 3 minutes to give a photosensitive resin layer K1 having a thickness of 2.4 μm.

Using a proximity-type exposure machine having a ultra-high pressure mercury lump (manufactured by Hitachi High-Tech Electronics Engineering Co., Ltd.), the substrate was pattern-exposed at an exposure of 300 mJ/cm$^2$ with a distance of 200 μm between the photosensitive resin layer and the surface of an exposing mask (quartz exposure mask having an image pattern) while allowing the substrate and the mask to stand straight.

Then, pure water was sprayed through a shower nozzle to uniformly moisten the surface of the photosensitive resin layer K1, and shower developing was performed at 23° C. for 80 seconds with a KOH-based developer (containing KOH and a nonionic surfactant, trade name: CDK-1, manufactured by Fuji Film Electronic Materials Co., Ltd.) at a flat nozzle pressure of 0.04 MPa to obtain a patterning image. Subsequently, ultrapure water was sprayed through an ultrahigh pressure washing nozzle at a pressure of 9.8 MPa to remove the residue, to obtain a black (K) image. Subsequently, the substrate having the black image thereon was heat-treated at 220° C. for 30 minutes.

—Formation of Red (R) Pixels—

Using a colored photosensitive resin composition R1 having a composition described in Table 3 below, heat-treated R pixels were formed on the substrate having the K image formed thereon, in the same manner as the formation of the black (K) image.

The thickness of the photosensitive resin layer R1, and the coating amounts of the pigments (C.I.P.R.254 and C.I.P.R.177) are shown in Table 6.

—Formation of Green (G) Pixels—

Using a colored photosensitive resin composition G1 having a composition described in Table 4 below, heat treated G pixels were formed on the substrate having the K image and R pixels formed thereon, in the same manner as the formation of the black (K) image.

The thickness of the photosensitive resin layer G1, and the coating amounts of the pigments (C.I.P.G.36 and C.I.P.Y.150) are shown in Table 7.

—Formation of Blue (B) Pixels—

Using a colored photosensitive resin composition B1 having a composition described in Table 5 below, heat-treated B pixels were formed on the substrate having the K image, the R pixels, and the G pixels formed thereon, in the same manner as the formation of the black (K) image, so that a desired color filter was obtained.

The thickness of the photosensitive resin layer B1, and the coating amounts of the pigments (C.I.P.B.15:6 and C.I.P.V.23) are shown in Table 8.

TABLE 2

| Colored photosensitive resin composition | K1 |
|---|---|
| K pigment dispersion 1 (carbon black) | 25 |
| Propylene glycol monomethyl ether acetate | 8.0 |
| Methyl ethyl ketone | 53 |
| Binder 2 | 9.1 |
| Hydroquinone monomethyl ether | 0.002 |
| DPHA liquid | 4.2 |
| 2,4-Bis(trichloromethyl)-6-[4'-(N,N-bisethoxy-carbonylmethyl)-3'-bromophenyl]-s-triazine | 0.16 |
| Surfactant 1 | 0.044 |

(Unit: part)

TABLE 3

| | Example | | | | | | | | | | Comparative Example | | |
|---|---|---|---|---|---|---|---|---|---|---|---|---|---|
| | 1 | 2 | 3 | 4 | 5 | 6 | 7 | 8 | 9 | 10 | 1 | 2 | 3 |
| Colored photosensitive resin composition | R1 | R2 | R3 | R4 | R5 | R6 | R7 | R8 | R9 | R10 | R11 | R12 | R13 |
| R pigment dispersion 1 (C.I.P.R.254) | 40.0 | 42.0 | 44.0 | 46.0 | 48.0 | 40.0 | 42.0 | 44.0 | 46.0 | 48.0 | 38.0 | 50.0 | 50.0 |
| R pigment dispersion 2 (C.I.P.R.177) | 4.5 | 4.7 | 5.0 | 5.2 | 5.5 | 4.5 | 4.7 | 5.0 | 5.2 | 5.5 | 4.3 | 5.7 | 5.7 |
| Propylene glycol monomethyl ether acetate | 7.6 | 7.6 | 7.6 | 7.6 | 7.6 | 7.6 | 7.6 | 7.6 | 7.6 | 7.6 | 7.6 | 7.6 | 7.6 |
| Methyl ethyl ketone | 37 | 37 | 37 | 37 | 37 | 37 | 37 | 37 | 37 | 37 | 37 | 37 | 37 |
| Binder-1 | 0.7 | 0.7 | 0.7 | 0.7 | 0.7 | 0.7 | 0.7 | 0.7 | 0.7 | 0.7 | 0.7 | 0.7 | 0.7 |
| DPHA liquid | 3.8 | 3.8 | 3.8 | 3.6 | 3.8 | 3.8 | 3.8 | 3.8 | 3.8 | 3.8 | 3.8 | 3.8 | 3.8 |
| 2-trichloromethyl-5-(p-styrylstyryl)-1,3,4-oxadiazole | 0.12 | 0.12 | 0.12 | 0.12 | 0.12 | 0.17 | 0.17 | 0.17 | 0.17 | 0.17 | 0.17 | 0.17 | 0.17 |
| 2,4-Bis(trichloromethyl)-6-[4'-(N,N-bisethoxy-carbonylmethyl)-3'-bromophenyl]-s-triazine | 0.05 | 0.05 | 0.05 | 0.05 | 0.05 | — | — | — | — | — | — | 0.05 | 0.05 |
| Phenothiazine | 0.010 | 0.010 | 0.010 | 0.010 | 0.010 | 0.009 | 0.009 | 0.009 | 0.009 | 0.009 | 0.009 | 0.009 | 0.009 |
| Surfactant 1 | 0.06 | 0.06 | 0.06 | 0.06 | 0.03 | 0.06 | 0.06 | 0.06 | 0.06 | 0.06 | 0.06 | 0.06 | — |

(Unit: part)

TABLE 4

| | Example | | | | | | | | | | Comparative Example | | |
|---|---|---|---|---|---|---|---|---|---|---|---|---|---|
| | 1 | 2 | 3 | 4 | 5 | 6 | 7 | 8 | 9 | 10 | 1 | 2 | 3 |
| Colored photosensitive resin composition | G1 | G2 | G3 | G4 | G5 | G6 | G7 | G8 | G9 | G10 | G11 | G12 | G13 |
| G pigment dispersion 1 (C.I.P.G.36) | 28.4 | 26.1 | 23.7 | 21.3 | 19.0 | 28.4 | 26.1 | 23.7 | 21.3 | 19.0 | 29.6 | 16.6 | 16.6 |
| Y pigment dispersion 1 (C.I.P.Y.150) | 15.0 | 13.8 | 12.5 | 11.3 | 10.0 | 15.0 | 13.8 | 12.5 | 11.3 | 10.0 | 15.6 | 8.8 | 8.8 |
| Propylene glycol monomethyl ether acetate | 29.1 | 29.1 | 29.1 | 29.1 | 29.1 | 29.1 | 29.1 | 29.1 | 29.1 | 29.1 | 29.1 | 29.1 | 29.1 |
| Methyl ethyl ketone | 26 | 26 | 26 | 26 | 26 | 26 | 26 | 26 | 26 | 26 | 26 | 26 | 26 |
| Cyclohexanone | 1.3 | 1.3 | 1.3 | 1.3 | 1.3 | 1.3 | 1.3 | 1.3 | 1.3 | 1.3 | 1.3 | 1.3 | 1.3 |
| Binder-2 | 2.5 | 2.5 | 2.5 | 2.5 | 2.5 | 2.5 | 2.5 | 2.5 | 2.5 | 2.5 | 2.5 | 2.5 | 2.5 |
| DPHA liquid | 3.5 | 3.5 | 3.5 | 3.5 | 3.5 | 3.5 | 3.5 | 3.5 | 3.5 | 3.5 | 3.5 | 3.5 | 3.5 |
| 2-trichloromethyl-5-(p-styrylstyryl)-1,3,4-oxadiazole | 0.12 | 0.12 | 0.12 | 0.12 | 0.12 | 0.17 | 0.17 | 0.17 | 0.17 | 0.17 | 0.12 | 0.12 | 0.12 |
| 2,4-Bis(trichloromethyl)-6-[4'-(N,N-bisethoxy-carbonylmethyl)-3'-bromophenyl]-s-triazine | 0.05 | 0.05 | 0.05 | 0.05 | 0.05 | — | — | — | — | — | — | 0.05 | 0.05 |
| Phenothiazine | 0.005 | 0.005 | 0.005 | 0.005 | 0.005 | 0.005 | 0.005 | 0.005 | 0.005 | 0.005 | 0.005 | 0.005 | 0.005 |
| Surfactant 1 | 0.07 | 0.07 | 0.07 | 0.07 | 0.07 | 0.07 | 0.07 | 0.07 | 0.07 | 0.07 | 0.07 | 0.07 | — |

(Unit: part)

TABLE 5

| | Example | | | | | | | | | | Comparative Example | | |
|---|---|---|---|---|---|---|---|---|---|---|---|---|---|
| | 1 | 2 | 3 | 4 | 5 | 6 | 7 | 8 | 9 | 10 | 1 | 2 | 3 |
| Colored photosensitive resin composition | B1 | B2 | B3 | B4 | B5 | B6 | B7 | B8 | B9 | B10 | B11 | B12 | B13 |
| B pigment dispersion 1 (C.I.P.B.15:6) | 8.6 | 8.4 | 8.0 | 7.6 | 7.4 | 8.6 | 8.4 | 8.0 | 7.6 | 7.4 | 8.8 | 7.2 | 7.2 |
| B pigment dispersion 2 (C.I.P.B.15:6 C.I.P.V.23) | 15.0 | 14.7 | 14.0 | 13.3 | 13.0 | 15.0 | 14.7 | 14.0 | 13.3 | 13.0 | 15.4 | 12.6 | 12.6 |
| Propylene glycol monomethyl ether acetate | 28 | 28 | 28 | 28 | 28 | 28 | 28 | 28 | 28 | 28 | 28 | 28 | 28 |
| Methyl ethyl ketone | 26 | 26 | 26 | 26 | 26 | 26 | 26 | 26 | 26 | 26 | 26 | 26 | 26 |
| Binder-3 | 17.2 | 17.2 | 17.2 | 17.2 | 17.2 | 17.2 | 17.2 | 17.2 | 17.2 | 17.2 | 17.2 | 17.2 | 17.2 |

TABLE 5-continued

|  | Example | | | | | | | | | | Comparative Example | | |
| --- | --- | --- | --- | --- | --- | --- | --- | --- | --- | --- | --- | --- | --- |
|  | 1 | 2 | 3 | 4 | 5 | 6 | 7 | 8 | 9 | 10 | 1 | 2 | 3 |
| DPHA liquid | 4.0 | 4.0 | 4.0 | 4.0 | 4.0 | 4.0 | 4.0 | 4.0 | 4.0 | 4.0 | 4.0 | 4.0 | 4.0 |
| 2-trichloromethyl-5-(p-styrylstyryl)-1,3,4-oxadiazole | 0.14 | 0.14 | 0.14 | 0.14 | 0.14 | 0.16 | 0.16 | 0.16 | 0.16 | 0.16 | 0.16 | 0.16 | 0.16 |
| 2,4-Bis(trichloromethyl)-6-[4'-(N,N-bisethoxy-carbonylmethyl)-3'-bromophenyl]-s-triazine | 0.02 | 0.02 | 0.02 | 0.02 | 0.02 | — | — | — | — | — | — | 0.02 | 0.02 |
| Phenothiazine | 0.02 | 0.02 | 0.02 | 0.02 | 0.02 | 0.02 | 0.02 | 0.02 | 0.02 | 0.02 | 0.02 | 0.02 | 0.02 |
| Surfactant 1 | 0.06 | 0.06 | 0.06 | 0.06 | 0.06 | 0.06 | 0.06 | 0.06 | 0.06 | 0.06 | 0.06 | 0.06 | — |

(Unit: part)

Herein, preparation of the colored photosensitive resin compositions K1, R1, G1 and B1 described in the above Tables 2 to 5 will be explained.

The colored photosensitive resin composition K1 was obtained by: measuring off the K pigment dispersion 1 and propylene glycol monomethyl ether acetate respectively in the amounts shown in Table 2, then mixing them at a temperature of 24° C. (±2° C.) and stirring the mixture at 150 RPM for 10 minutes, then measuring off methyl ethyl ketone, the binder 2, hydroquinone monomethyl ether, the DPHA liquid, 2,4-bis(trichloromethyl)-6-[4'-(N,N-bisethoxycarbonylmethyl)-3'-bromophenyl]-s-triazine, and the surfactant 1 respectively in the amounts shown in Table 2, then adding them to the above mixture in this order at a temperature of 25° C. (±), and then stirring the resultant mixture at 150 RPM at a temperature of 40° C. (±2° C.) for 30 minutes.

In the composition shown in Table 2, the K pigment dispersion 1 had the following composition:

| Carbon black | 13.1 parts |
| --- | --- |
| Dispersant (compound 1 shown below) | 0.65 part |
| Polymer (random copolymer of benzyl methacrylate and methacrylic acid (benzyl methacrylate/methacrylic acid = 72/28 by mol), molecular weight: 37,000) | 6.72 parts |
| Propylene glycol monomethyl ether acetate | 79.53 parts |

Compound 1

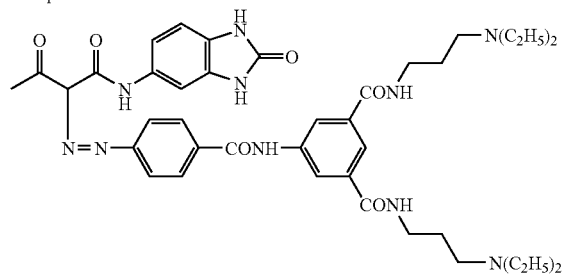

the binder 2 had the following composition:

| Polymer (random copolymer of benzyl methacrylate and methacrylic acid (benzyl methacrylate/methacrylic acid = 78/22 by mol), molecular weight: 38,000) | 27 parts |
| --- | --- |
| Propylene glycol monomethyl ether acetate | 73 parts | the DPHA liquid had the following composition:

| Dipentaerythritol hexaacrylate (containing 500 ppm of polymerization inhibitor MEHQ; manufactured by Nippon Kayaku Co., Ltd., trade name: KAYARAD DPHA) | 76 parts |
| --- | --- |
| Propylene glycol monomethyl ether acetate | 24 parts | the surfactant 1 had the following composition:

| Polymer structure 1 shown below | 30 parts |
| --- | --- |
| Methyl ethyl ketone | 70 parts |

Polymer Structure 1

$$-(CH_2-CH)_{40}-\quad -(CH_2-CH)_x-\quad -(CH_2-CH)_y-$$
$$\begin{array}{ccc} | & | & | \\ O=C & O=C & O=C \\ | & | & | \\ OCH_2CH_2C_nF_{2n+1} & O(PO)_7H & O(EO)_7H \end{array}$$

(n = 6, x = 55, y = 5, Mw = 33940, Mw/Mn = 2.55 PO: propylene oxide, EO: ethylene oxide)

The colored photosensitive resin composition R1 was obtained by: measuring off the R pigment dispersion 1, the R pigment dispersion 2, and propylene glycol monomethyl ether acetate respectively in the amounts shown in Table 3, then mixing them at a temperature of 24° C. (±2° C.) and stirring the mixture at 150 RPm for 10 minutes, then measuring off methyl ethyl ketone, the binder 1, the DPHA liquid, 2-trichloromethyl-5-(p-styrylstyryl)-1,3,4-oxadiazole, 2,4-bis(trichlormethyl)-6-[4'-(N,N-bisethoxycarbonylmethyl)-3'-bromophenyl]-s-triazine, and phenothiazine respectively in the amounts shown in Table 3, then adding them to the above mixture in this order at a temperature of 24° C. (±2° C.) and then stirring the resultant mixture at 150 RPM for 30 minutes, then measuring off the surfactant 1 in the amount shown in Table 3, then adding the surfactant 1 to the mixture at a temperature of 24° C. (±2° C.), then stirring the resultant mixture at 30 RPM for 5 minutes, and then filtering the mixture with a nylon mesh #200.

In the composition shown in Table 3, the R pigment dispersion 1 had the following composition:

| C.I.P.R.254 | 8 parts |
| --- | --- |
| Dispersant (compound 1 shown above) | 0.8 part |
| Polymer (random copolymer of benzyl methacrylate and methacrylic acid (benzyl methacrylate/methacrylic acid = 72/28 by mol), molecular weight: 30,000) | 8 parts |
| Propylene glycol monomethyl ether acetate | 83 parts | the R pigment dispersion 2 had the following composition:

| | |
|---|---|
| C.I.P.R.177 | 18 parts |
| Polymer (random copolymer of benzyl methacrylate and methacrylic acid (benzyl methacrylate/methacrylic acid = 72/28 by mol), molecular weight: 30,000) | 12 parts |
| Propylene glycol monomethyl ether acetate | 70 parts | the binder 1 had the following composition:

| | |
|---|---|
| a polymer (a random copolymer of benzyl methacrylate, methacrylic acid, and methyl methacrylate (benzyl methacrylate:methacrylic acid:methyl methacrylate = 38:25:37 by mol), molecular weight: 40,000) | 27 parts |
| propyleneglycol monomethyl ether acetate | 73 parts |

The colored photosensitive resin composition G1 was obtained by measuring off the G pigment dispersion 1, the Y pigment dispersion 1, and propylene glycol monomethyl ether acetate respectively in the amounts shown in Table 4, then mixing them at a temperature of 24° C. (±2° C.) and stirring the mixture at 150 RPM for 10 minutes, then measuring off methyl ethyl ketone, cyclohexanone, the binder 2, the DPHA liquid, 2-trichloromethyl-5-(p-styrylstyryl)-1,3,4-oxadiazole, 2,4-bis(trichloromethyl)-6-[4'-(N,N-bisethoxycarbonylmethyl)-3'-bromophenyl]-s-triazine, and phenothiazine respectively in the amounts shown in Table 4, then adding them to the above mixture in this order at a temperature of 24° C. (±2° C.), then stirring the resultant mixture at 150 RPM for 30 minutes, then measuring off the surfactant 1 in the amount shown in Table 4, then adding the surfactant 1 to the mixture at a temperature of 24° C. (±2° C.), then stirring the resultant mixture at 30 RPM for 5 minutes, and then filtering the mixture with a nylon mesh #200.

In the composition shown in Table 4, the G pigment dispersion 1 had the following composition:

| | |
|---|---|
| C.I.P.G.36 | 18 parts |
| Polymer (random copolymer of benzyl methacrylate and methacrylic acid (benzyl methacrylate/methacrylic acid = 72/28 by mol), molecular weight: 38,000) | 12 parts |
| Cyclohexanone | 35 parts |
| Propylene glycol monomethyl ethyl acetate | 35 parts | the Y pigment dispersion 1 was CF Yellow EX3393 manufactured by Mikuni Shikiso Co., Ltd.

The colored photosensitive resin composition B1 was obtained by: measuring off the B pigment dispersion 1, the B pigment dispersion 2, and propylene glycol monomethyl ether acetate respectively in the amounts shown in Table 5, then mixing them a temperature of 24° C. (±2° C.) and stirring the mixture at 150 RPM for 10 minutes, then measuring off methyl ethyl ketone, the binder 3, the DPHA liquid, 2-trichloromethyl-5-(p-styrylstyryl)-1,3,4-oxadiazole, and 2,4-bis(trichloromethyl)-6-[4'-(N,N-bisethoxycarbonylmethyl)-3'-bromophenyl]-s-triazine, and phenothiazine respectively in the amounts shown in Table 5, then adding them to the above mixture in this order at a temperature of 25° C. (±2° C.), then stirring the mixture at 150 RPM at a temperature of 40° C. (±2° C.) for 30 minutes, then measuring off the surfactant 1 in the amount shown in Table 5, then adding the surfactant 1 to the mixture at a temperature of 24° C. (±2° C.), then stirring the mixture at 30 RPM for 5 minutes, and then filtering the mixture with a nylon mesh #200.

In the composition shown in Table 5, the B pigment dispersion 1 was CF Blue EX3357 manufactured by Mikuni Shikiso Co., Ltd.

the pigment dispersion 2 was CF Blue EX3383 manufactured by Mikuni Shikiso Co, Ltd.

the binder 3 had the following composition:

| | |
|---|---|
| Polymer (random copolymer of benzyl methacrylate-methacrylic acid-methyl methacrylate (benzyl methacrylate:methacrylic acid:methyl methacrylate = 36/22/42 by mol), molecular weight: 38,000) | 27 parts |
| Propylene glycol monomethyl ether acetate | 73 parts |

Examples 2 to 10 and Comparative Examples 1 to 3

Color filters were obtained in the same manner as in Example 1, except that the compositions of the colored photosensitive resin composition R1, G1 or B1 used in Example 1 were replaced by compositions of colored photosensitive resin compositions R2 to R13, G2 to G13 or B2 to B13 shown in Tables 3 to 5, respectively.

The thicknesses of the respective photosensitive resin layers of R, G and B, and the coating amounts of the respective pigments are shown in Tables 6 to 8.

[Evaluation]

—Measurement of Chromaticity—

Chromaticity of the color filters obtained above was measured with a microscopic photometer (trade name: OSP100 manufactured by Olympus Optics) at a pinhole diameter of 5 µm, and calculated as the result under an F10 light source with the 2-degree viewing angle. The results (xyY values, and difference (ΔE) from the target chromaticity) are shown in Tables 6 to 8.

—Coating Unevenness—

Substrates immediately after coating of the respective colored photosensitive resin compositions of R, G and B were irradiated with a light from an oblique direction emitted by a Na lamp in a dark chamber, and observed with the naked eye and under a magnifying glass, to confirm whether unevenness occurred or not.

—Display Unevenness—

After completion of the patterning, the substrates with pixels were irradiated with a light from an oblique direction emitted by a Na lamp in a dark chamber, and observed with the naked eye and under a magnifying glass, to confirm whether unevenness occurred or not.

—Overall Evaluation—

From the above evaluations, overall evaluation of the color filters was performed under the following criteria.

A: The ΔE value, coating unevenness, and display unevenness are all superior.

B: Although the ΔE value was better, slight coating unevenness or occurrence of display unevenness is observed.

C: At least one of the ΔE value, coating unevenness, and display unevenness is markedly inferior.

The above evaluation results are shown in Tables 6 to 8.

TABLE 6

|  | Example |  |  |  |  |  |  |  |  |  | Comparative Example |  |  |
|---|---|---|---|---|---|---|---|---|---|---|---|---|---|
|  | 1 | 2 | 3 | 4 | 5 | 6 | 7 | 8 | 9 | 10 | 1 | 2 | 3 |
| Colored photosensitive resin composition | R1 | R2 | R3 | R4 | R5 | R6 | R7 | R8 | R9 | R10 | R11 | R12 | R13 |
| Photosensitive resin layer thickness (μm) | 1.60 | 1.60 | 1.60 | 1.60 | 1.60 | 1.60 | 1.60 | 1.60 | 1.60 | 1.60 | 1.60 | 1.60 | 1.60 |
| Pigment coating amount (g/m²) | 1.00 | 1.05 | 1.10 | 1.15 | 1.20 | 1.00 | 1.05 | 1.10 | 1.15 | 1.20 | 0.95 | 1.25 | 1.25 |
| C.I.P.R.254 Coating amount (g/m²) | 0.80 | 0.84 | 088 | 0.92 | 0.96 | 0.80 | 0.84 | 0.88 | 0.92 | 0.96 | 0.76 | 1.00 | 1.00 |
| C.I.P.R.177 Coating amount (g/m²) | 0.20 | 0.21 | 0.22 | 0.23 | 0.24 | 0.20 | 0.21 | 0.22 | 0.23 | 0.24 | 0.19 | 0.25 | 0.25 |
| x | 0.652 | 0.654 | 0.656 | 0.658 | 0.659 | 0.652 | 0.654 | 0.656 | 0.658 | 0.659 | 0.650 | 0.661 | 0.661 |
| y | 0.335 | 0.336 | 0.336 | 0.335 | 0.335 | 0.335 | 0.336 | 0.336 | 0.335 | 0.335 | 0.334 | 0.335 | 0.335 |
| Y | 22.1 | 21.8 | 21.4 | 21.1 | 20.7 | 22.1 | 21.8 | 21.4 | 21.1 | 20.7 | 22.3 | 20.4 | 20.4 |
| ΔE | 4.8 | 2.3 | 0 | 2.0 | 3.9 | 4.8 | 2.3 | 0 | 2.0 | 3.9 | 8.4 | 6.5 | 6.5 |
| Coating unevenness | Not observable | Not observable | Not observable | Not observable | Not observable | Not observable | Not observable | Not observable | Not observable | Not observable | Not observable | Not observable | Observable |
| Display unevenness | Not observable | Not observable | Not observable | Not observable | Not observable | Slightly observable | Slightly observable | Slightly observable | Slightly observable | Slightly observable | Slightly observable | Not observable | Observable |
| Evaluation | A | A | A | A | A | B | B | B | B | B | C | C | C |

(Unit: part)

TABLE 7

|  | Example |  |  |  |  |  |  |  |  |  | Comparative Example |  |  |
|---|---|---|---|---|---|---|---|---|---|---|---|---|---|
|  | 1 | 2 | 3 | 4 | 5 | 6 | 7 | 8 | 9 | 10 | 1 | 2 | 3 |
| Colored photosensitive resin composition | G1 | G2 | G3 | G4 | G5 | G6 | G7 | G8 | G9 | G10 | G11 | G12 | G13 |
| Photosensitive resin layer thickness (μm) | 1.60 | 1.60 | 1.60 | 1.60 | 1.60 | 1.60 | 1.60 | 1.60 | 1.60 | 1.60 | 1.60 | 1.60 | 1.60 |
| Pigment coating amount (g/m²) | 1.92 | 1.76 | 1.60 | 1.44 | 1.28 | 1.92 | 1.76 | 1.60 | 1.44 | 1.28 | 2.00 | 1.12 | 1.12 |
| C.I.P.G.36 Coating amount (g/m²) | 1.34 | 1.23 | 1.12 | 1.01 | 0.90 | 1.34 | 1.23 | 1.12 | 1.01 | 0.90 | 1.40 | 0.78 | 0.78 |
| C.I.P.Y.150 Coating amount (g/m²) | 0.58 | 0.53 | 0.48 | 0.43 | 0.38 | 0.58 | 0.53 | 0.48 | 0.43 | 0.38 | 0.60 | 0.34 | 0.34 |
| x | 0.284 | 0.288 | 0.293 | 0.297 | 0.301 | 0.284 | 0.288 | 0.293 | 0.297 | 0.301 | 0.280 | 0.303 | 0.303 |
| y | 0.649 | 0.641 | 0.634 | 0.626 | 0.618 | 0.649 | 0.641 | 0.634 | 0.626 | 0.618 | 0.656 | 0.614 | 0.614 |
| Y | 47.7 | 50.0 | 52.1 | 54.4 | 56.6 | 47.7 | 50.0 | 52.1 | 54.4 | 56.6 | 45.7 | 57.8 | 57.8 |
| ΔE | 4.0 | 1.8 | 0 | 2.3 | 4.6 | 4.0 | 1.8 | 0 | 2.3 | 4.6 | 5.7 | 5.8 | 5.8 |
| Coating unevenness | Not observable | Not observable | Not observable | Not observable | Not observable | Not observable | Not observable | Not observable | Not observable | Not observable | Not observable | Not observable | Observable |
| Display unevenness | Not observable | Not observable | Not observable | Not observable | Not observable | Slightly observable | Slightly observable | Slightly observable | Slightly observable | Slightly observable | Slightly observable | Not observable | Observable |
| Evaluation | A | A | A | A | A | B | B | B | B | B | C | C | C |

(Unit: part)

TABLE 8

|  | Example |  |  |  |  |  |  |  |  |  | Comparative Example |  |  |
|---|---|---|---|---|---|---|---|---|---|---|---|---|---|
|  | 1 | 2 | 3 | 4 | 5 | 6 | 7 | 8 | 9 | 10 | 1 | 2 | 3 |
| Colored photosensitive resin composition | B1 | B2 | B3 | B4 | B5 | B6 | B7 | B8 | B9 | B10 | B11 | B12 | B13 |

TABLE 8-continued

|  | Example | | | | | | | | | | Comparative Example | | |
|---|---|---|---|---|---|---|---|---|---|---|---|---|---|
|  | 1 | 2 | 3 | 4 | 5 | 6 | 7 | 8 | 9 | 10 | 1 | 2 | 3 |
| Photosensitive resin layer thickness (μm) | 1.60 | 1.60 | 1.60 | 1.60 | 1.60 | 1.60 | 1.60 | 1.60 | 1.60 | 1.60 | 1.60 | 1.60 | 1.60 |
| Pigment coating amount (g/m$^2$) | 0.75 | 0.74 | 0.70 | 0.67 | 0.65 | 0.75 | 0.74 | 0.70 | 0.67 | 0.65 | 0.77 | 0.63 | 0.63 |
| C.I.P.B.15:6 Coating amount (g/m$^2$) | 0.67 | 0.66 | 0.63 | 0.60 | 0.59 | 0.67 | 0.66 | 0.63 | 0.60 | 0.59 | 0.69 | 0.57 | 0.57 |
| C.I.P.V.23 Coating amount (g/m$^2$) | 0.075 | 0.074 | 0.070 | 0.067 | 0.065 | 0.075 | 0.074 | 0.070 | 0.067 | 0.065 | 0.077 | 0.063 | 0.063 |
| x | 0.145 | 0.145 | 0.146 | 0.147 | 0.147 | 0.145 | 0.145 | 0.146 | 0.147 | 0.147 | 0.145 | 0.147 | 0.147 |
| y | 0.082 | 0.084 | 0.088 | 0.092 | 0.094 | 0.082 | 0.084 | 0.088 | 0.092 | 0.094 | 0.080 | 0.097 | 0.097 |
| Y | 6.24 | 6.40 | 6.85 | 7.37 | 7.59 | 6.24 | 6.40 | 6.85 | 7.37 | 7.59 | 5.92 | 7.86 | 7.86 |
| ΔE | 4.0 | 2.9 | 0 | 3.2 | 4.6 | 4.0 | 2.9 | 0 | 3.2 | 4.6 | 6.3 | 6.3 | 6.3 |
| Coating unevenness | Not observable | Not observable | Not observable | Not observable | Not observable | Not observable | Not observable | Not observable | Not observable | Not observable | Not observable | Not observable | Observable |
| Display unevenness | Not observable | Not observable | Not observable | Not observable | Not observable | Slightly observable | Slightly observable | Slightly observable | Slightly observable | Slightly observable | Slightly observable | Not observable | Observable |
| Evaluation | A | A | A | A | A | B | B | B | B | B | C | C | C |

(Unit: part)

[Production and Evaluation of Liquid Crystal Display Device]

Liquid crystal display device was formed using the color filters of Examples 1 to 10 and the color filters of Comparative Examples 1 to 3. It was confirmed that the liquid crystal display devices using the color filters of Examples shows better display property than the liquid crystal display devices using the color filters of Comparative Examples.

Example 11

[Production of Color Filter (Production by Lamination of Photosensitive Resin Transfer Material)]

—Production of Photosensitive Resin Transfer Material—

A thermoplastic resin layer coating liquid having the following formulation H1 was coated on a polyethylene terephthalate film temporary support with a thickness of 75 μm using a slit nozzle, followed by drying. Then, an intermediate layer coating liquid having the following formulation P1 was coated thereon, and dried. Further, the colored photosensitive resin composition K1 was coated thereon and dried. In this way, a thermoplastic resin layer with a dry film thickness of 14.6 μm, an intermediate layer with a dry film thickness of 1.6 μm, and a photosensitive resin layer with a dry film thickness of 2.4 μm were provided on the temporary support. Further, a protective film (polypropylene film with a thickness of 12 μm) was adhered onto the photosensitive resin layer by pressure.

As described above, a photosensitive resin transfer material K1 was produced in which the temporary support, the thermoplastic resin layer, the intermediate layer (oxygen blocking film), and the black (K) photosensitive resin layer were unified.

Formulation H1 for thermoplastic resin layer coating liquid:

| | |
|---|---|
| Methanol | 11.1 parts |
| Propylene glycol monomethyl ether acetate | 6.36 parts |
| Methyl ethyl ketone | 52.4 parts |
| Methyl methacrylate-(2-ethylhexyl acrylate)-benzyl methacrylate-methacrylic acid copolymer (copolymer composition ratio (mole ratio): Methyl methacrylate/2-ethylhexyl acrylate/benzyl methacrylate/methacrylic acid = 55/11.7/4.5/28.8, molecular weight = 90000, Tg: about 70° C.) | 5.83 parts |
| Styrene-acrylic acid copolymer (copolymerization composition ratio (mole ratio): Styrene/acrylic acid = 63/37, molecular weight = 10000, Tg: 100° C.) | 13.6 parts |
| Compound obtained by dehydration-condensation of bisphenol A with 2 equivalents of pentaethylene glycol monomethacrylate (trade name: 2,2-bis[4-methacryloxypolyethoxy)phenyl]propane manufactured by Shin-Nakamura Chemical Co., Ltd.) | 9.1 parts |
| Surfactant 1 described above | 0.54 part |

Formulation P1 for intermediate layer coating liquid:

| | |
|---|---|
| PVA205 (polyvinyl alcohol, manufactured by Kuraray Co., Ltd., saponification degree = 88%, polymerization degree 550) | 32.2 parts |
| Polyvinylpyrrolidone (trade name: K-30 manufactured by ISP Japan Ltd.) | 14.9 parts |
| Distilled water | 524 parts |
| Methanol | 429 parts |

Photosensitive resin transfer materials R101, G101 and B101 were produced in the same manner as the production of the photosensitive resin transfer material K1, except that the colored photosensitive resin composition K1 used in produc tion of the photosensitive resin transfer material K1 was replaced respectively by colored photosensitive resin compositions R101, G101 or B101 having the compositions shown in Tables 9 to 11 below.

The methods for producing the colored photosensitive resin compositions R101, G101 and B101 were similar to the methods for producing the colored photosensitive resin compositions R1, G1 or B1, respectively.

TABLE 9

|  | Example | | | | | | |
|---|---|---|---|---|---|---|---|
|  | 11 | 12 | 13 | 14 | 15 | 16 | 17 |
| Colored photosensitive resin composition | R101 | R102 | R103 | R104 | R105 | R106 | R107 |
| R pigment dispersion 1 (C.I.P.R.254) | 40.0 | 42.0 | 44.0 | 46.0 | 48.0 | 40.0 | 42.0 |
| R pigment dispersion 2 (C.I.P.R.177) | 4.5 | 4.7 | 5.0 | 5.2 | 5.5 | 4.5 | 4.7 |
| Propylene glycol monomethyl ether acetate | 7.6 | 7.6 | 7.6 | 7.6 | 7.6 | 7.6 | 7.6 |
| Methyl ethyl ketone | 37 | 37 | 37 | 37 | 37 | 37 | 37 |
| Binder-1 | 0.8 | 0.8 | 0.8 | 0.8 | 0.8 | 0.8 | 0.8 |
| DPHA liquid | 4.4 | 4.4 | 4.4 | 4.4 | 4.4 | 4.4 | 4.4 |
| 2-trichloromethyl-5-(p-styrylstyryl)-1,3,4-oxadiazole | 0.14 | 0.14 | 0.14 | 0.14 | 0.14 | 0.20 | 0.20 |
| 2,4-Bis(trichloromethyl)-6-[4'-(N,N-bisethoxy-carbonylmethyl)-3'-bromophenyl]-s-triazine | 0.06 | 0.06 | 0.06 | 0.06 | 0.06 | — | — |
| Phenothiazine | 0.010 | 0.010 | 0.010 | 0.010 | 0.010 | 0.009 | 0.009 |
| Additive 1 | 0.52 | 0.52 | 0.52 | 0.52 | 0.52 | 0.52 | 0.52 |
| Surfactant 1 | 0.06 | 0.06 | 0.06 | 0.06 | 0.03 | 0.06 | 0.06 |

|  | Example | | | Comparative Example | | |
|---|---|---|---|---|---|---|
|  | 18 | 19 | 20 | 4 | 5 | 6 |
| Colored photosensitive resin composition | R108 | R109 | R110 | R111 | R112 | R113 |
| R pigment dispersion 1 (C.I.P.R.254) | 44.0 | 46.0 | 48.0 | 38.0 | 50.0 | 50.0 |
| R pigment dispersion 2 (C.I.P.R.177) | 5.0 | 5.2 | 5.5 | 4.3 | 5.7 | 5.7 |
| Propylene glycol monomethyl ether acetate | 7.6 | 7.6 | 7.6 | 7.6 | 7.6 | 7.6 |
| Methyl ethyl ketone | 37 | 37 | 37 | 37 | 37 | 37 |
| Binder-1 | 0.8 | 0.8 | 0.8 | 0.8 | 0.8 | 0.8 |
| DPHA liquid | 4.4 | 4.4 | 4.4 | 4.4 | 4.4 | 4.4 |
| 2-trichloromethyl-5-(p-styrylstyryl)-1,3,4-oxadiazole | 0.20 | 0.20 | 0.20 | 0.20 | 0.20 | 0.20 |
| 2,4-Bis(trichloromethyl)-6-[4'-(N,N-bisethoxy-carbonylmethyl)-3'-bromophenyl]-s-triazine | — | — | — | — | 0.06 | 0.06 |
| Phenothiazine | 0.009 | 0.009 | 0.009 | 0.009 | 0.009 | 0.009 |
| Additive 1 | 0.52 | 0.52 | 0.52 | 0.52 | 0.52 | 0.52 |
| Surfactant 1 | 0.06 | 0.06 | 0.06 | 0.06 | 0.06 | — |

(Unit: part)

TABLE 10

|  | Example | | | | | | |
|---|---|---|---|---|---|---|---|
|  | 11 | 12 | 13 | 14 | 15 | 16 | 17 |
| Colored photosensitive resin composition | G101 | G102 | G103 | G104 | G105 | G106 | G107 |
| G pigment dispersion 1 (C.I.P.G.36) | 28.4 | 26.1 | 23.7 | 21.3 | 19.0 | 28.4 | 26.1 |
| Y pigment dispersion 1 (C.I.P.Y.150) | 15.0 | 13.8 | 12.5 | 11.3 | 10.0 | 15.0 | 13.8 |
| Propylene glycol monomethyl ether acetate | 29.1 | 29.1 | 29.1 | 29.1 | 29.1 | 29.1 | 29.1 |
| Methyl ethyl ketone | 26 | 26 | 26 | 26 | 26 | 26 | 26 |
| Cyclohexanone | 1.3 | 1.3 | 1.3 | 1.3 | 1.3 | 1.3 | 1.3 |
| Binder-2 | 3.0 | 3.0 | 3.0 | 3.0 | 3.0 | 3.0 | 3.0 |
| DPHA liquid | 4.3 | 4.3 | 4.3 | 4.3 | 4.3 | 4.3 | 4.3 |

TABLE 10-continued

| | | | | | | | |
|---|---|---|---|---|---|---|---|
| 2-trichloromethyl-5-(p-styrylstyryl)-1,3,4-oxadiazole | 0.15 | 0.15 | 0.15 | 0.15 | 0.15 | 0.21 | 0.21 |
| 2,4-Bis(trichloromethyl)-6-[4'-(N,N-bisethoxy-carbonylmethyl)-3'-bromophenyl]-s-triazine | 0.06 | 0.06 | 0.06 | 0.06 | 0.06 | — | — |
| Phenothiazine | 0.005 | 0.005 | 0.005 | 0.005 | 0.005 | 0.005 | 0.005 |
| Surfactant 1 | 0.07 | 0.07 | 0.07 | 0.07 | 0.07 | 0.07 | 0.07 |

| | | Example | | | Comparative Example | | |
|---|---|---|---|---|---|---|---|
| | | 18 | 19 | 20 | 4 | 5 | 6 |
| Colored photosensitive resin composition | | G108 | G109 | G110 | G111 | G112 | G113 |
| G pigment dispersion 1 (C.I.P.G.36) | | 23.7 | 21.3 | 19.0 | 29.6 | 16.6 | 16.6 |
| Y pigment dispersion 1 (C.I.P.Y.150) | | 12.5 | 11.3 | 10.0 | 15.6 | 8.8 | 8.8 |
| Propylene glycol monomethyl ether acetate | | 29.1 | 29.1 | 29.1 | 29.1 | 29.1 | 29.1 |
| Methyl ethyl ketone | | 26 | 26 | 26 | 26 | 26 | 26 |
| Cyclohexanone | | 1.3 | 1.3 | 1.3 | 1.3 | 1.3 | 1.3 |
| Binder-2 | | 3.0 | 3.0 | 3.0 | 3.0 | 3.0 | 3.0 |
| DPHA liquid | | 4.3 | 4.3 | 4.3 | 4.3 | 4.3 | 4.3 |
| 2-trichloromethyl-5-(p-styrylstyryl)-1,3,4-oxadiazole | | 0.21 | 0.21 | 0.21 | 0.15 | 0.15 | 0.15 |
| 2,4-Bis(trichloromethyl)-6-[4'-(N,N-bisethoxy-carbonylmethyl)-3'-bromophenyl]-s-triazine | | — | — | — | — | 0.06 | 0.06 |
| Phenothiazine | | 0.005 | 0.005 | 0.005 | 0.005 | 0.005 | 0.005 |
| Surfactant 1 | | 0.07 | 0.07 | 0.07 | 0.07 | 0.07 | — |

(Unit: part)

TABLE 11

| | Example | | | | | | |
|---|---|---|---|---|---|---|---|
| | 11 | 12 | 13 | 14 | 15 | 16 | 17 |
| Colored photosensitive resin composition | B101 | B102 | B103 | B104 | B105 | B106 | B107 |
| B pigment dispersion 1 (C.I.P.B.15:6) | 8.6 | 8.4 | 8.0 | 7.6 | 7.4 | 8.6 | 8.4 |
| B pigment dispersion 2 (C.I.P.B.15:6 C.I.P.V.23) | 15.0 | 14.7 | 14.0 | 13.3 | 13.0 | 15.0 | 14.7 |
| Propylene glycol monomethyl ether acetate | 28 | 28 | 28 | 28 | 28 | 28 | 28 |
| Methyl ethyl ketone | 26 | 26 | 26 | 26 | 26 | 26 | 26 |
| Binder-3 | 18.5 | 18.5 | 18.5 | 18.5 | 18.5 | 18.5 | 18.5 |
| DPHA liquid | 4.3 | 4.3 | 4.3 | 4.3 | 4.3 | 4.3 | 4.3 |
| 2-trichloromethyl-5-(p-styrylstyryl)-1,3,4-oxadiazole | 0.15 | 0.15 | 0.15 | 0.15 | 0.15 | 0.17 | 0.17 |
| 2,4-Bis(trichloromethyl)-6-[4'-(N,N-bisethoxy-carbonylmethyl)-3'-bromophenyl]-s-triazine | 0.02 | 0.02 | 0.02 | 0.02 | 0.02 | — | — |
| Phenothiazine | 0.02 | 0.02 | 0.02 | 0.02 | 0.02 | 0.02 | 0.02 |
| Surfactant 1 | 0.06 | 0.06 | 0.06 | 0.06 | 0.06 | 0.06 | 0.06 |

| | | Example | | | Comparative Example | | |
|---|---|---|---|---|---|---|---|
| | | 18 | 19 | 20 | 4 | 5 | 6 |
| Colored photosensitive resin composition | | B108 | B109 | B110 | B111 | B112 | B113 |
| B pigment dispersion 1 (C.I.P.B.15:6) | | 8.0 | 7.6 | 7.4 | 8.8 | 7.2 | 7.2 |

TABLE 11-continued

| | | | | | | |
|---|---|---|---|---|---|---|
| B pigment dispersion 2 (C.I.P.B.15:6 C.I.P.V.23) | 14.0 | 13.3 | 13.0 | 15.4 | 12.6 | 12.6 |
| Propylene glycol monomethyl ether acetate | 28 | 28 | 28 | 28 | 28 | 28 |
| Methyl ethyl ketone | 26 | 26 | 26 | 26 | 26 | 26 |
| Binder-3 | 18.5 | 18.5 | 18.5 | 18.5 | 18.5 | 18.5 |
| DPHA liquid | 4.3 | 4.3 | 4.3 | 4.3 | 4.3 | 4.3 |
| 2-trichloromethyl-5-(p-styrylstyryl)-1,3,4-oxadiazole | 0.17 | 0.17 | 0.17 | 0.17 | 0.17 | 0.17 |
| 2,4-Bis(trichloromethyl)-6-[4'-(N,N-bisethoxy-carbonylmethyl)-3'-bromophenyl]-s-triazine | — | — | — | — | 0.02 | 0.02 |
| Phenothiazine | 0.02 | 0.02 | 0.02 | 0.02 | 0.02 | 0.02 |
| Surfactant 1 | 0.06 | 0.06 | 0.06 | 0.06 | 0.06 | — |

(Unit: part)

In the compositions shown in Table 9, the additive 1 was a phosphoric-ester-based special surfactant (HIPLAAD ED152 manufactured by Kusumoto Chemicals Ltd.).

—Formulation of Black (K) Image—

A non-alkali glass substrate was washed with a rotating brush having nylon hairs while a glass cleaner liquid regulated at 25° C. was sprayed by a shower for 20 seconds, then the glass substrate was washed with pure water shower. Thereafter, a silane coupling solution (a 0.3% aqueous solution of N-β(aminoethyl) γ-aminopropyltrimethoxysilane, trade name: KBM603, manufactured by Shin-Etsu Chemical Co., Ltd.) was sprayed for 20 seconds by a shower, and the substrate was washed with a pure water shower. This substrate was heat-treated by a substrate pre-heating apparatus at 100° C. for 2 minutes, and was supplied to the next laminator.

The protective film of the photosensitive resin transfer material K1 was peeled off, and the substrate heated to 100° C. was laminated with the photosensitive resin transfer material R101 at a rubber roller temperature of 130° C., a linear pressure of 100 N/cm$^2$, and a conveying rate of 2.2 m/min, using a laminator (LACMIC II type, manufactured by Hitachi Industries Co., Ltd.).

After the temporary support was peeled off, the photosensitive resin was pattern-exposed by using a proximity-type exposure machine having an ultrahigh pressure mercury lamp (manufactured by Hitachi High-Tech Electronics Engineering Co., Ltd) at an exposure of 70 mJ/cm$^2$ with a distance of 200 μm between the photosensitive resin layer and the surface of the exposure mask (quartz exposure mask having image pattern), while allowing the substrate and the mask to stand straight.

Then, shower development was performed with a triethanolamine-based developer (trade name: T-PD1 manufactured by Fuji Photo Film Co., Ltd., containing 2.5% of triethanolamine and also containing nonionic surfactant and polypropylene-based anti-foaming agent) at 30° C. for 50 seconds at a flat nozzle pressure of 0.04 MPa, so that the thermoplastic resin layer and the oxygen blocking film were removed.

Subsequently, using a sodium-carbonate-based developer (trade name: T-CD1, manufactured by Fuji Photo Film Co., Ltd., containing 0.06 mol/l of sodium bicarbonate, 0.06 mol/l of sodium carbonate, and 1% of sodium dibutylnaphthalenesulfonate, and also containing an anionic surfactant, an anti-foaming agent, and a stabilizer), another shower developing was performed at 29° C. for 30 seconds under a cone-type nozzle pressure of 0.15 MPa to develop the photosensitive resin layer, so that the patterning image was obtained.

Subsequently, using a detergent (trade name: "T-SD1" (manufactured by Fuji Photo Film Co., Ltd.) containing a phosphate, a silicate, a nonionic surfactant, an anti-foaming agent, and a stabilizer, or trade name "T-SD2" (manufactured by Fuji Photo Film Co., Ltd.) containing sodium carbonate and a phenoxyoxyethylene-based surfactant), the residue was removed by a shower and a rotating brush having nylon hairs at 33° C. for 20 seconds under a cone-type nozzle pressure of 0.02 MPa, so that a black (K) image was obtained. Thereafter, after the substrate was subjected to post exposure to light of 500 mJ/cm$^2$ from the resin layer side emitted by an ultrahigh pressure mercury lamp, heat-treatment was performed at 220° C. for 15 minutes.

The substrate having the K image formed thereon was washed with a brush in the same manner as described above, and then washed with pure water shower, and then supplied to a substrate pre-heating apparatus without using a silane coupling liquid.

-Formation of Red (R) Pixels-

Heat-treated green (R) pixels were obtained by using the photosensitive resin transfer material R101, in the same manner as the formation of the black (K) image with the photosensitive resin transfer material K1. The exposure was 40 mJ/cm$^2$, and the development with the sodium-carbonate-based developer was performed at 35° C. for 35 seconds.

The thickness of the photosensitive layer R101, and the coating amounts of the pigments (C.I.P.R.254 and C.I.P.R.177) are shown in Table 12.

The substrate having the K image and the R pixels thereon was washed again with a brush in the same manner as described above, and washed with pure water shower, and supplied to a substrate pre-heating apparatus without using a silane coupling liquid.

—Formation of Green (G) Pixels—

Heat-treated green (G) pixels were obtained by using the photosensitive resin transfer material G101, in the same manner as the formation of the red (R) image with the photosensitive resin transfer material R101. The exposure was 40 mJ/cm$^2$, and the development with the sodium-carbonate-based developer was performed at 34° C. for 45 seconds.

The thickness of the photosensitive layer G101 and the coating amounts of the pigments (C.I.P.G.36 and C.I.P.Y.150) are shown in Table 13.

This substrate having the K image, the R pixels, and G pixels thereon was washed again with a brush in the same manner as described above, then washed with pure water shower, then supplied to the substrate pre-heating apparatus without using a silane coupling liquid.

-Formation of Blue (B) Pixels-

Heat-treated blue (B) pixels were obtained by using the photosensitive resin transfer material B101 in the same manner as the formation of the red (R) image with the photosensitive resin transfer material R101. The exposure was 30 mJ/cm$^2$, and the development with the sodium-carbonate-based developer was performed at 36° C. for 40 seconds.

The thickness of the photosensitive resin layer B101 and the coating amounts of the pigments (C.I.P.B.15:6 and C.I.P.V.23) are shown in Table 14.

This substrate having the K image, the R pixels, the G pixels, and the B pixels thereon was baked at 240° C. for 50 minutes to obtain a color filter.

Example 12 to 20 and Comparative Examples 4 to 6

Color filters were obtained in the same manner as in Example 11 except that the colored photosensitive resin compositions R101, G101 and B101 used in Example 11 were replaced by colored photosensitive resin compositions R102 to R113, G102 to G113, and B102 to B113 having the composition described in Tables 9 to 11.

The thicknesses of the respective photosensitive resin layer of R, G and B, and the coating amounts of the respective pigments are shown in Tables 12 to 14.

[Evaluation]

Measurement of chromaticity, observation of coating unevenness and display unevenness, and overall evaluation of the color filters were conducted by the same method and criteria as described above.

The evaluation results are shown in Tables 12 to 14.

TABLE 12

| | Example | | | | | | |
|---|---|---|---|---|---|---|---|
| | 11 | 12 | 13 | 14 | 15 | 16 | 17 |
| Colored photosensitive resin composition | R101 | R102 | R103 | R104 | R105 | R106 | R107 |
| Photosensitive resin layer thickness (μm) | 2.0 | 2.0 | 2.0 | 2.0 | 2.0 | 2.0 | 2.0 |
| Pigment coating amount (g/m$^2$) | 1.00 | 1.05 | 1.10 | 1.15 | 1.20 | 1.00 | 1.05 |
| C.I.P.R.254 Coating amount (g/m$^2$) | 0.80 | 0.84 | 0.88 | 0.92 | 0.96 | 0.80 | 0.84 |
| C.I.P.R.177 Coating amount (g/m$^2$) | 0.20 | 0.21 | 0.22 | 0.23 | 0.24 | 0.20 | 0.21 |
| x | 0.652 | 0.654 | 0.656 | 0.658 | 0.659 | 0.652 | 0.654 |
| y | 0.335 | 0.336 | 0.336 | 0.335 | 0.335 | 0.335 | 0.336 |
| Y | 22.1 | 21.8 | 21.4 | 21.1 | 20.7 | 22.1 | 21.8 |
| ΔE | 4.8 | 2.3 | 0 | 2.0 | 3.9 | 4.8 | 2.3 |
| Coating unevenness | Not observable | Not observable | Not observable | Not observable | Not observable | Not observable | Not observable |
| Display unevenness | Not observable | Not observable | Not observable | Not observable | Not observable | Slightly observable | Slightly observable |
| Evaluation | A | A | A | A | A | B | B |

| | Example | | | Comparative Example | | |
|---|---|---|---|---|---|---|
| | 18 | 19 | 20 | 4 | 5 | 6 |
| Colored photosensitive resin composition | R108 | R109 | R110 | R111 | R112 | R113 |
| Photosensitive resin layer thickness (μm) | 2.0 | 2.0 | 2.0 | 2.0 | 2.0 | 2.0 |
| Pigment coating amount (g/m$^2$) | 1.10 | 1.15 | 1.20 | 0.95 | 1.25 | 1.25 |
| C.I.P.R.254 Coating amount (g/m$^2$) | 0.88 | 0.92 | 0.96 | 0.76 | 1.00 | 1.00 |
| C.I.P.R.177 Coating amount (g/m$^2$) | 0.22 | 0.23 | 0.24 | 0.19 | 0.25 | 0.25 |
| x | 0.656 | 0.658 | 0.659 | 0.650 | 0.661 | 0.661 |
| y | 0.336 | 0.335 | 0.335 | 0.334 | 0.335 | 0.335 |
| Y | 21.4 | 21.1 | 20.7 | 22.3 | 20.4 | 20.4 |
| ΔE | 0 | 2.0 | 3.9 | 8.4 | 6.5 | 6.5 |
| Coating unevenness | Not observable | Not observable | Not observable | Not observable | Not observable | Observable |

TABLE 12-continued

| | | | | | | |
|---|---|---|---|---|---|---|
| Display unevenness | Slightly observable | Slightly observable | Slightly observable | Slightly observable | Not observable | Observable |
| Evaluation | B | B | B | C | C | C |

(Unit: part)

TABLE 13

| | Example | | | | | | |
|---|---|---|---|---|---|---|---|
| | 11 | 12 | 13 | 14 | 15 | 16 | 17 |
| Colored photosensitive resin composition | G101 | G102 | G103 | G104 | G105 | G106 | G107 |
| Photosensitive resin layer thickness (μm) | 2.0 | 2.0 | 2.0 | 2.0 | 2.0 | 2.0 | 2.0 |
| Pigment coating amount (g/m$^2$) | 1.92 | 1.76 | 1.60 | 1.44 | 1.28 | 1.00 | 1.05 |
| C.I.P.G.36 Coating amount (g/m$^2$) | 1.34 | 1.23 | 1.12 | 1.01 | 0.90 | 0.70 | 0.74 |
| C.I.P.Y.150 Coating amount (g/m$^2$) | 0.58 | 0.53 | 0.48 | 0.43 | 0.38 | 0.30 | 0.32 |
| x | 0.284 | 0.288 | 0.293 | 0.297 | 0.301 | 0.284 | 0.288 |
| y | 0.649 | 0.641 | 0.634 | 0.626 | 0.618 | 0.649 | 0.641 |
| Y | 47.7 | 50.0 | 52.1 | 54.4 | 56.6 | 47.7 | 50.0 |
| ΔE | 4.0 | 1.8 | 0 | 2.3 | 4.6 | 4.0 | 1.8 |
| Coating unevenness | Not observable | Not observable | Not observable | Not observable | Not observable | Not observable | Not observable |
| Display unevenness | Not observable | Not observable | Not observable | Not observable | Not observable | Slightly observable | Slightly observable |
| Evaluation | A | A | A | A | A | B | B |

| | | Example | | | Comparative Example | | |
|---|---|---|---|---|---|---|---|
| | | 18 | 19 | 20 | 4 | 5 | 6 |
| Colored photosensitive resin composition | | G108 | G109 | G110 | G111 | G112 | G113 |
| Photosensitive resin layer thickness (μm) | | 2.0 | 2.0 | 2.0 | 2.0 | 2.0 | 2.0 |
| Pigment coating amount (g/m$^2$) | | 1.10 | 1.15 | 1.20 | 2.00 | 1.12 | 1.12 |
| C.I.P.G.36 Coating amount (g/m$^2$) | | 0.77 | 0.81 | 0.84 | 1.40 | 0.78 | 0.78 |
| C.I.P.Y.150 Coating amount (g/m$^2$) | | 0.33 | 0.35 | 0.36 | 0.60 | 0.34 | 0.34 |
| x | | 0.293 | 0.297 | 0.301 | 0.280 | 0.303 | 0.303 |
| y | | 0.634 | 0.626 | 0.618 | 0.656 | 0.614 | 0.614 |
| Y | | 52.1 | 54.4 | 56.6 | 45.7 | 57.8 | 57.8 |
| ΔE | | 0 | 2.3 | 4.6 | 5.7 | 5.8 | 5.8 |
| Coating unevenness | | Not observable | Not observable | Not observable | Not observable | Not observable | Observable |
| Display unevenness | | Slightly observable | Slightly observable | Slightly observable | Slightly observable | Not observable | Observable |
| Evaluation | | B | B | B | C | C | C |

(Unit: part)

TABLE 14

| | Example | | | | | | |
|---|---|---|---|---|---|---|---|
| | 11 | 12 | 13 | 14 | 15 | 16 | 17 |
| Colored photosensitive resin composition | B101 | B102 | B103 | B104 | B105 | B106 | B107 |
| Photosensitive resin layer thickness (μm) | 2.0 | 2.0 | 2.0 | 2.0 | 2.0 | 2.0 | 2.0 |
| Pigment coating amount (g/m$^2$) | 0.75 | 0.74 | 0.70 | 0.67 | 0.65 | 0.75 | 0.74 |
| C.I.P.B.15:6 Coating amount (g/m$^2$) | 0.67 | 0.66 | 0.63 | 0.60 | 0.59 | 0.67 | 0.66 |
| C.I.P.V.23 Coating amount (g/m$^2$) | 0.075 | 0.074 | 0.070 | 0.067 | 0.065 | 0.075 | 0.074 |
| x | 0.145 | 0.145 | 0.146 | 0.147 | 0.147 | 0.145 | 0.145 |
| y | 0.082 | 0.084 | 0.088 | 0.092 | 0.094 | 0.082 | 0.084 |
| Y | 6.24 | 6.40 | 6.85 | 7.37 | 7.59 | 6.24 | 6.40 |
| ΔE | 4.0 | 2.9 | 0 | 3.2 | 4.6 | 4.0 | 2.9 |
| Coating unevenness | Not observable | Not observable | Not observable | Not observable | Not observable | Not observable | Not observable |
| Display unevenness | Not observable | Not observable | Not observable | Not observable | Not observable | Slightly observable | Slightly observable |
| Evaluation | A | A | A | A | A | B | B |

| | | Example | | | Comparative Example | | |
|---|---|---|---|---|---|---|---|
| | | 18 | 19 | 20 | 4 | 5 | 6 |
| | Colored photosensitive resin composition | B108 | B109 | B110 | B111 | B112 | B113 |
| | Photosensitive resin layer thickness (μm) | 2.0 | 2.0 | 2.0 | 2.0 | 2.0 | 2.0 |
| | Pigment coating amount (g/m$^2$) | 0.70 | 0.67 | 0.65 | 0.77 | 0.63 | 0.63 |
| | C.I.P.B.15:6 Coating amount (g/m$^2$) | 0.63 | 0.60 | 0.59 | 0.69 | 0.57 | 0.57 |
| | C.I.P.V.23 Coating amount (g/m$^2$) | 0.070 | 0.067 | 0.065 | 0.077 | 0.063 | 0.063 |
| | x | 0.146 | 0.147 | 0.147 | 0.145 | 0.147 | 0.147 |
| | y | 0.088 | 0.092 | 0.094 | 0.090 | 0.097 | 0.097 |
| | Y | 6.85 | 7.37 | 7.59 | 5.92 | 7.86 | 7.86 |
| | ΔE | 0 | 3.2 | 4.6 | 6.3 | 6.3 | 6.3 |
| | Coating unevenness | Not observable | Not observable | Not observable | Not observable | Not observable | Observable |
| | Display unevenness | Slightly observable | Slightly observable | Slightly observable | Slightly observable | Not observable | Observable |
| | Evaluation | B | B | B | C | C | C |

(Unit: part)

[Production and Evaluation of Liquid Crystal Display Device]

Liquid crystal display devices were produced using the color filters of Examples 11 to 20, and color filters of Comparative Examples 4 to 6. It was confirmed that the liquid crystal display devices using the color filters of Examples exhibit better display property than the liquid crystal display devices using the color filters of Comparative Examples.

What is claimed is:

1. A colored photosensitive resin composition comprising an alkali-soluble binder, a monomer or an oligomer, a photopolymerization initiator or a photopolymerization initiator system, and a coloring agent, wherein:

the coloring agent comprises a pigment C.I.P.B.15:6 and a pigment C.I.P.V.23;

when the colored photosensitive resin composition is coated and dried to form a film with a thickness of 1 to 3 μm, a content of the pigment C.I.P.B.15:6 in the coating film is 0.59 to 0.67 g/m$^2$ and a content of the pigment C.I.P.V.23 in the coating film is 0.065 to 0.075 g/m$^2$; and the photopolymerization initiator comprises trihalomethyloxadiazole.

2. A photosensitive resin transfer material comprising a temporary support and a photosensitive resin layer provided on the temporary support, wherein the photosensitive resin layer includes the colored photosensitive resin composition of claim 1.

3. A method of forming a photosensitive resin layer, the method comprising adhering the photosensitive resin transfer material of claim 2 to a substrate by a laminator.

4. A method for producing a color filter, the method comprising:
   forming a photosensitive resin layer;
   exposing the photosensitive resin layer;
   developing the photosensitive resin layer; and
   baking the photosensitive resin layer,
   wherein the photosensitive resin layer comprises the colored photosensitive resin composition of claim 1.

5. A color filter produced by the method of claim 4.

6. A liquid crystal display device using the color filter of claim 5.

7. A colored photosensitive resin composition according to claim 1, wherein the photopolymerization initiator further comprises a triarylimidazole dimer.

8. A coating film of a colored photosensitive resin composition, wherein:
   the colored photosensitive resin composition comprises an alkali-soluble binder, a monomer or an oligomer, a photopolymerization initiator or a photopolymerization initiator system, and a coloring agent;
   the coloring agent comprises a pigment C.I.P.B.15:6 and a pigment C.I.P.V.23;
   a content of the pigment C.I.P.B.15:6 in the coating film is 0.59 to 0.67 g/m$^2$;
   a content of the pigment C.I.P.V.23 in the coating film is 0.065 to 0.075 g/m$^2$; and the photopolymerization initiator comprises trihalomethyloxadiazole.

9. A coating film of a colored photosensitive resin composition according to claim 8, wherein the photopolymerization initiator further comprises a triarylimidazole dimer.

* * * * *